United States Patent [19]

Yamamoto et al.

[11] Patent Number: 4,870,565
[45] Date of Patent: Sep. 26, 1989

[54] PARALLEL TRANSFER TYPE DIRECTOR MEANS

[75] Inventors: Akira Yamamoto, Yokohama; Toru Nishigaki, Sagamihara; Akira Kurano; Kiyoshi Hisano, both of Odawara; Yoshiro Shiroyana, Odawara, all of Japan

[73] Assignee: Hitachi, Ltd., Tokyo, Japan

[21] Appl. No.: 322,119

[22] Filed: Mar. 13, 1989

Related U.S. Application Data

[63] Continuation of Ser. No. 236,757, Aug. 26, 1988, abandoned, which is a continuation of Ser. No. 56,355, May 28, 1987, Pat. No. 4,800,483, which is a continuation of Ser. No. 556,412, Nov. 30, 1983, abandoned.

[30] Foreign Application Priority Data

Dec. 1, 1982 [JP] Japan ................... 57-209420

[51] Int. Cl.$^4$ ........................... G06F 13/00
[52] U.S. Cl. .................................. 364/200
[58] Field of Search ... 364/200 MS File, 900 MS File, 364/300

[56] References Cited

U.S. PATENT DOCUMENTS

| | | | |
|---|---|---|---|
| 3,566,358 | 2/1971 | Hasbrouck | 364/200 |
| 3,913,074 | 10/1975 | Hamberg et al. | 364/200 |
| 4,245,307 | 1/1981 | Kapshiam et al. | 364/200 |
| 4,317,168 | 2/1982 | Mossina | 364/200 |
| 4,394,732 | 7/1983 | Svenson | 364/200 |
| 4,399,503 | 8/1983 | Hawley | 364/200 |
| 4,430,701 | 2/1984 | Christian et al. | 364/200 |
| 4,430,712 | 2/1984 | Coulsen et al. | 364/300 |
| 4,466,059 | 8/1984 | Bastron et al. | 364/200 |
| 4,467,421 | 8/1984 | White | 364/200 |
| 4,476,526 | 10/1984 | Dodd | 364/200 |
| 4,504,902 | 3/1985 | Gallaher et al. | 364/200 |
| 4,533,995 | 8/1985 | Chu et al. | 364/200 |
| 4,583,166 | 4/1986 | Hartung et al. | 364/200 |
| 4,620,279 | 10/1986 | Read et al. | 364/200 |

Primary Examiner—Gary V. Harkcom
Assistant Examiner—Christopher H. Lynt
Attorney, Agent, or Firm—Antonelli, Terry & Wands

[57] ABSTRACT

A computer system having a disk cache unit between a disk unit and the main storage unit. Ordinarily, the data transfer processing is carried out between the disk unit and the disk cache unit and between the disk cache unit and the main storage unit in this case. The present invention is characterized by enabling these two data transfer operations to be executed in parallel and to prevent a director from becoming the bottleneck of the processing due to the concentrated processing requests. For this purpose, the present invention provides for conducting a data transfer between the disk cache unit and a disk unit while a data transfer is taking place between the main storage unit and the disk cache unit. The director is configured, for example, with two data transfer controlling systems and two data transfer units for carrying out data transfer according to instructions for the two data transfer controlling systems.

9 Claims, 22 Drawing Sheets

CONTROL FLOW: ——→
DATA FLOW: ⇨

FIG. 7
(1)
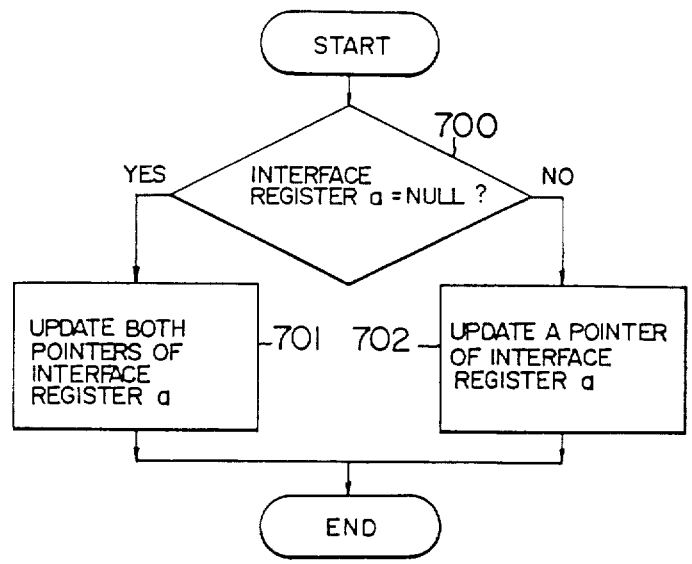
(2)
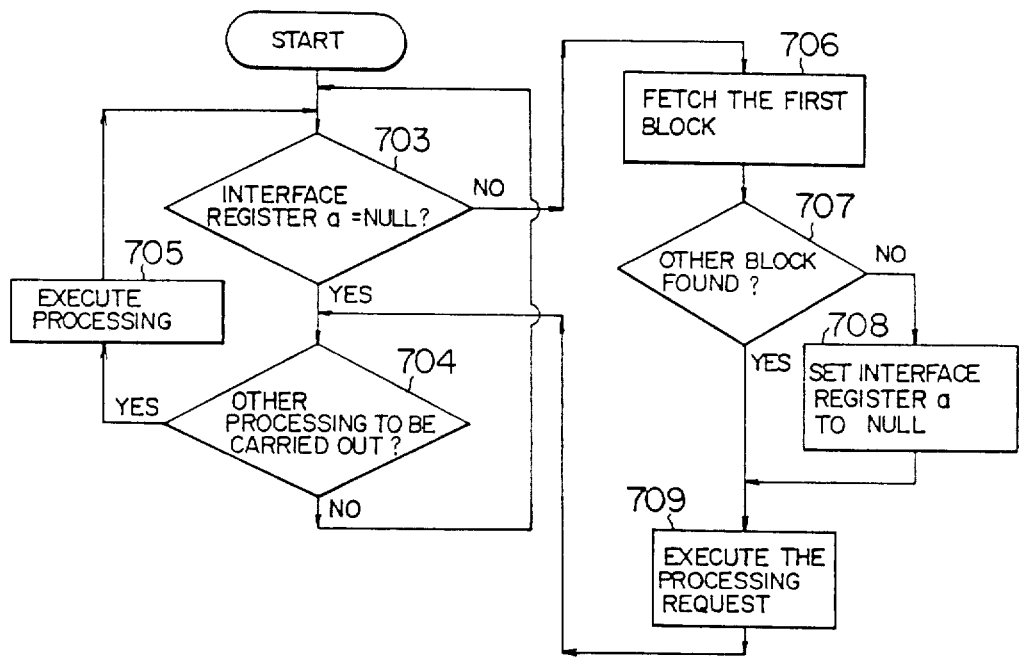

FIG. 8
(1)
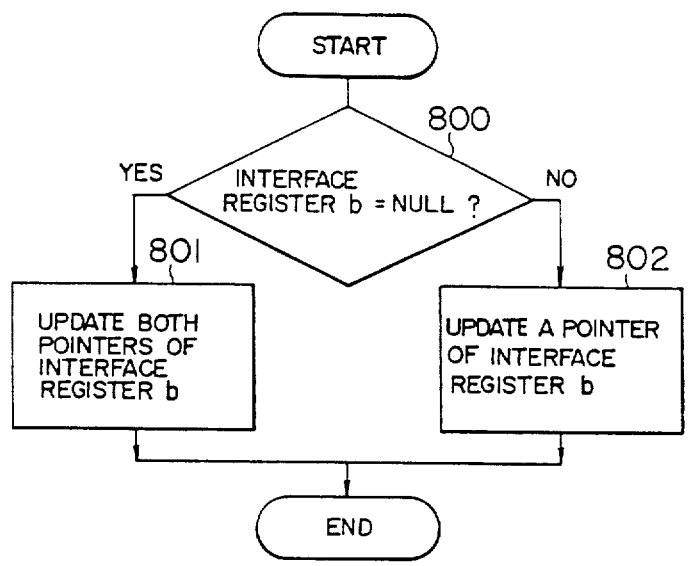
(2)
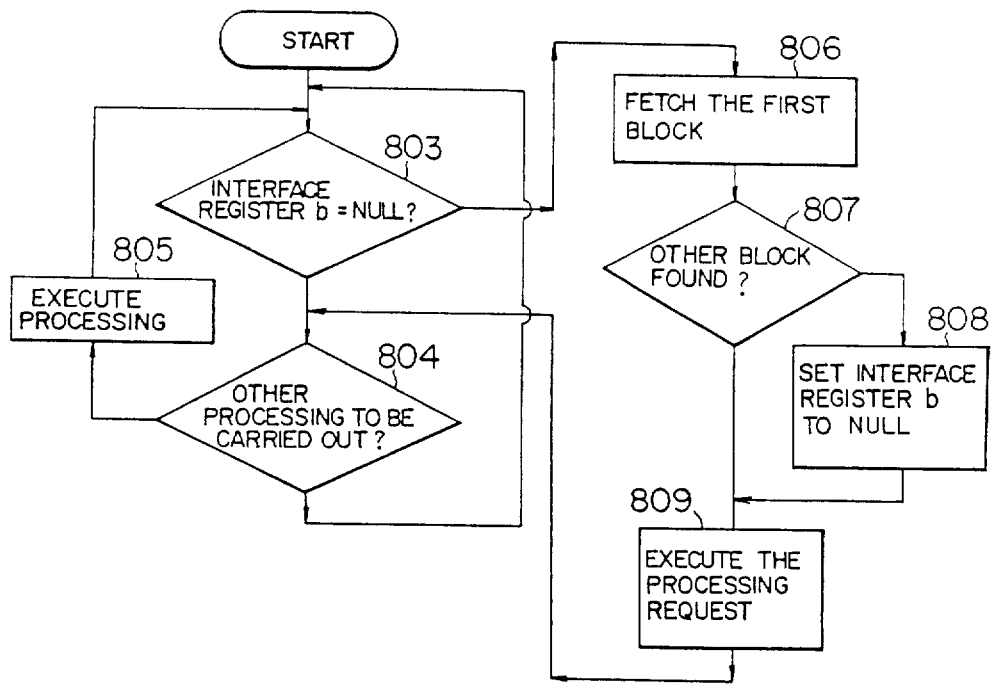

F I G. 20
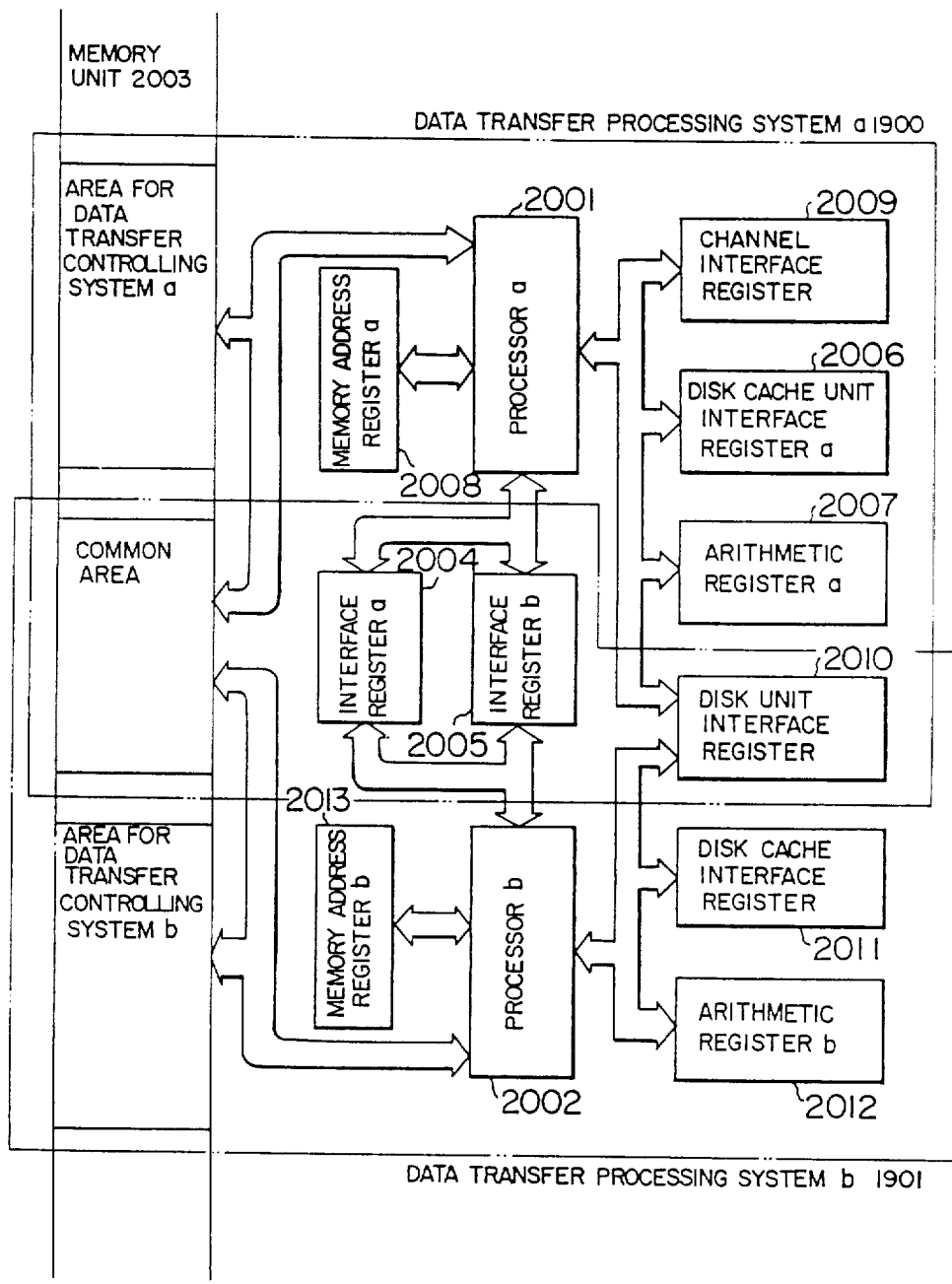

PARALLEL TRANSFER TYPE DIRECTOR MEANS

This is a continuation application of Ser. No. 236,757 filed Aug. 26, 1988, now abandoned which is a continuation of Ser. No. 056,355, 528 -87, now U.S. Pat. No. 4,800,483, which is a continuation of Ser. No. 556,412, 11-30-83, now abandoned.

BACKGROUND OF THE INVENTION

1. Field of the Invention

The present invention relates to a parallel transfer type director means which enables to transfer a data item B between a disk cache unit and a main storage unit while a data item A is being transferred between a disk unit and the disk cache unit.

2. Description of the Prior Art

A disk cache unit has been developed to speed up the input/output processing of a computer system which will be limited by the I/O bound condition because the access speed of the central processing unit (CPU) of the computer is increased. The input/output processing speed is improved by utilizing a disk cache unit wherein the data that will be frequently referenced by the CPU is stored in the disk cache unit. Therefore, the locality of reference rarely takes place. (In general, the number of files being used among the files stored in a disk unit is quite small.) This means that the data residing in the vicinity of a data item that is referenced by the CPU is considered to belong to a file being currently used. Therefore, the data found in the proximity of the data referenced by the CPU more frequently as compared with the other data. In this aspect, the data existing near the data accessed by the CPU is fetched into the disk cache unit. Furthermore, if the access pattern is predetermined like that of the sequential access processing, the pertinent data can be read in advance.

Consequently, the processing explained above is imposed on a director means of the disk controller unit when the disk cache unit is adopted; hence, the director becomes the new bottleneck of the computer system and the effect to be achieved by introducing the disk cache unit to the computer system cannot be satisfactorily obtained.

SUMMARY OF THE INVENTION

An object of the present invention is to prevent the director means from bottlenecking when a disk cache unit is adopted. To achieve this object, the present invention provides a means to be described as follows: A means for transferring data which is disposed in a computer system comprising a main storage unit, a disk cache unit, a plurality of disk units, and at least one director means; wherein said means for transferring data between said disk cache unit and one of said disk units while a data transfer is taking place between said main storage unit and said disk cache unit. Further, more concretely, the present invention provides procedures or methods for configuring said director means with two data transfer controlling systems which control two data transfer units for transferring data according to instructions from said two data transfer controlling systems.

BRIEF DESCRIPTION OF THE DRAWINGS

FIG. 7 shows the processing flowcharts of the data transfer systems for transferring data from the data transfer controlling system a 20 to the data transfer controlling system b 22;

FIG. 8 depicts the processing flowcharts of the data transfer systems for transferring data from the data transfer controlling system b 22 to the data transfer controlling system a 20;

FIG. 20 depicts a schematic diagram showing the configurations of the data transfer processing systems a 1900 and b 1901 illustrated in FIG. 19;

DESCRIPTION OF THE PREFERRED EMBODIMENTS

Figure 1:
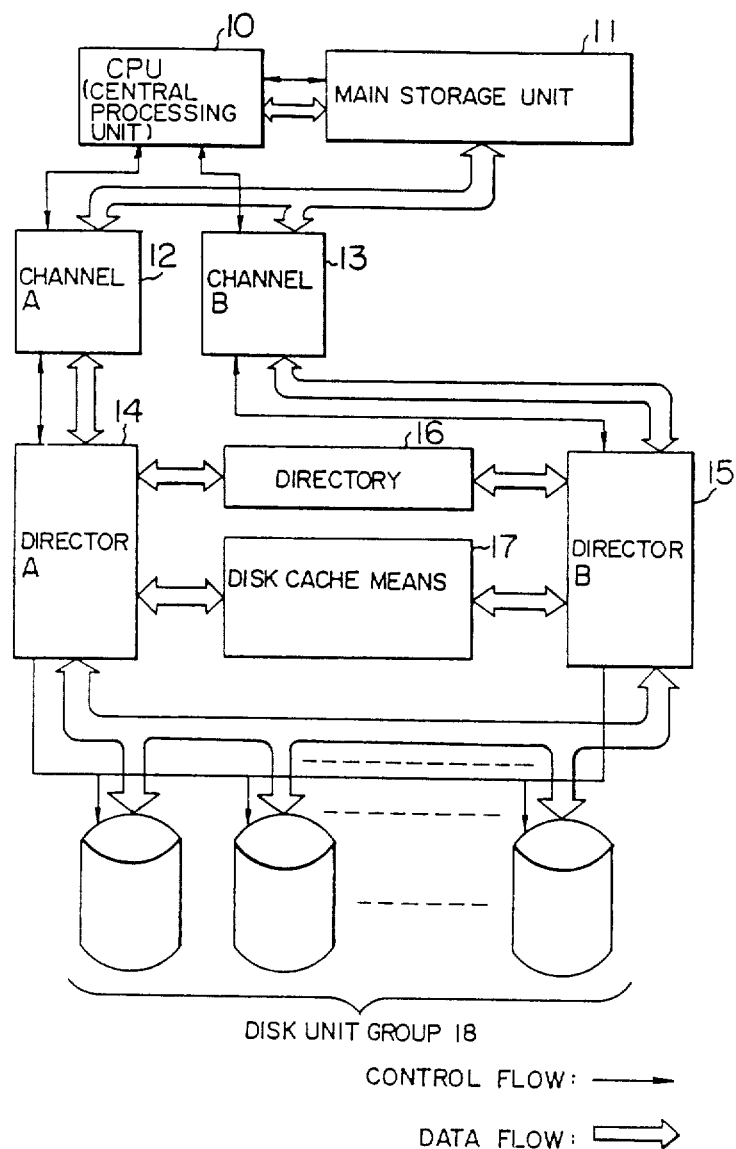
FIG. 1 illustrates a block diagram of an environment in which a director means according to the present invention is installed.

The present invention will be precisely explained according to embodiments. FIG. 1 shows the outline of the computer system to which the present invention is applied, wherein the computer system includes a CPU 10, a main storage unit 11, a channel A 12, a channel B 13, a director A 14, a director 16, a disk cache unit 17, and a disk unit group 18. The channels A 12 and B 13 have the same functions and configuration. This is also the case for the directors A 14 and B15. A plurality of accesses are possible for the disk cache unit 17, but this is not the case for the directory 16, that is, a request for the directory must be set to the wait state if the directory is busy due to other request. The wait time is negligible because the time required for referring the directory 16 is very short.

The basic operations of each unit will be described. When the CPU 101 requires an input/output processing for the disk unit group 18 during its operation, it activates the channel A 12 or B 13. In this case, the CPU 10 activates the respective channels so as to equalize the utilization of the channel A 12 to that of the channel B 13. The channel A 12 transfers the data read from the main storage unit 11 to the director A 1 and writes the data received from the director A 14 in the main storage unit 11. The channel B 13 performs the same processing as the channel A 12 excepting that the data transfer is carried out with the director B 15. The director A 14 checks the directory 16 to determine whether or not the data specified for an input/output request made from the channel A 12 resides in the disk cache unit 17. The directory 16 contains the information indicating locations of the disk unit group 18 with respect to the data items are fetched and stored in the disk cache unit 17. Since the disk cache unit 17 ordinarily comprises a volatile integrated circuit (IC) memory, its processing is finished for an output processing when the data is completely written in the disk unit group 18 irrespective of whether or not the data to be processed exists in the disk cache unit 17. In an output processing therefore, if the requested data is found in the disk cache unit 17, the director A 14 updates not only in the disk cache unit 17 but also the data in the disk unit group 18. If the data does not reside in the disk cache unit 17, the director A 14 updates only the data found in the disk unit group 18. If the data exists in the disk cache unit 17 for an input request, the director 14 A transmits the data directly from the disk cache unit 17. This means that, the effect obtained by introducing the disk cache unit 17 to speed up the input/output processing is taken only if the pertinent data is found in the disk cache unit 17 when an input request is issued. If the input data does not reside in the disk cache unit 17, the data is read from the disk unit group 18 and is sent to the disk cache unit 17. In this case, other data on the same track where the read data exist is read from the track and stored in the disk cache unit 17 because such data is imagined to be referenced in the near future. If the access pattern is predetermined like that of the sequential access processing, the input operation speed can be increased by storing the data to be accessed next into the disk cache unit 17 in advance. The director A 14 has these functions explained above. The director B 15 has also the same functions.

Although these features explained above can be realized without providing the parallel transfer function of the present invention for the directors A 14 and B 15, they are the fundamental processing utilized in the present invention. An object of the present invention is to speed up the input/output processing by concurrently executing above-mentioned function necessary for the directors A 14 and B 15.

First of all terms to be used in the subsequent explanations will be defined. "Hit" means that the data specified for an input/output request exists in the disk cache unit 18, while "miss" indicates that said data does not exist in the disk cache unit 18. "Read" is an input request, whereas "write" is an output request.

The director A 14 (or director B 15) is configured in one of two methods: A method for configuring with two data transfer control systems and two data transfer units, wehrein the control and transfer are separated; and a method for configuring with two data transfer precessing systems, wherein the control and transfer are unified. First, the former will be described.

Figure 2:
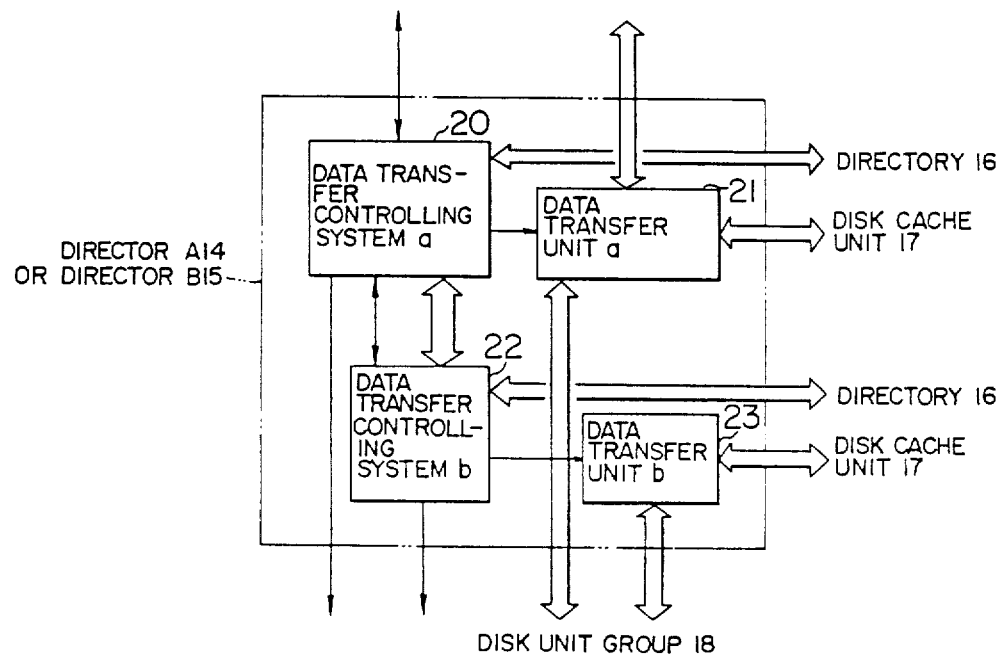
FIG. 2 depicts a block diagram showing one of methods for configuring a director means according to the present invention.

FIG. 2 illustrates a block diagram of the configuration of the director A 14 (B 15). The director comprises a data transfer controlling system a 20, a data transfer unit a 21, a data transfer controlling system b 22, and a data transfer unit b 23. The data transfer controlling systems a 20 and b 22 decide an operation to perform a data transfer according to the directory 16, the interface with the channel A 12 or B 13, and the interface with the disk unit group 18. Based on the decision, the data transfer controlling system a 20 issues a data transfer request to the data transfer unit a 21, whereas the data transfer controlling system b 21 issues a data transfer request to the data transfer unit b 23. The data transfer units a 21 and b 23 are the hardware devices for transferring data according to an instruction from the corresponding controlling system. The hardware device can transmit the data received from a unit A to units B and C simultaneously. Since the channel A 12 need not be distinguished from channel B 13 in the subsequent explanations, these channels are collectively called a channel 25.

Next, the method for configuring the data transfer controlling systems a 20 and b 22 will be explained. Two methods can be considered: A method for configuring it by assigning a processor to each controlling system (that is, multiprocessor system), and a method for configuring it by assigning a processor to implement two controlling systems (that is, multirun system). Even if two controlling systems are implemented by a processor) the performance is not lowered because the time period necessary for controlling data transfer extremely shorter than that required for a data transfer. Data items are transferred by the data transfer units a 21 and b 23, respectively.

Figure 3:
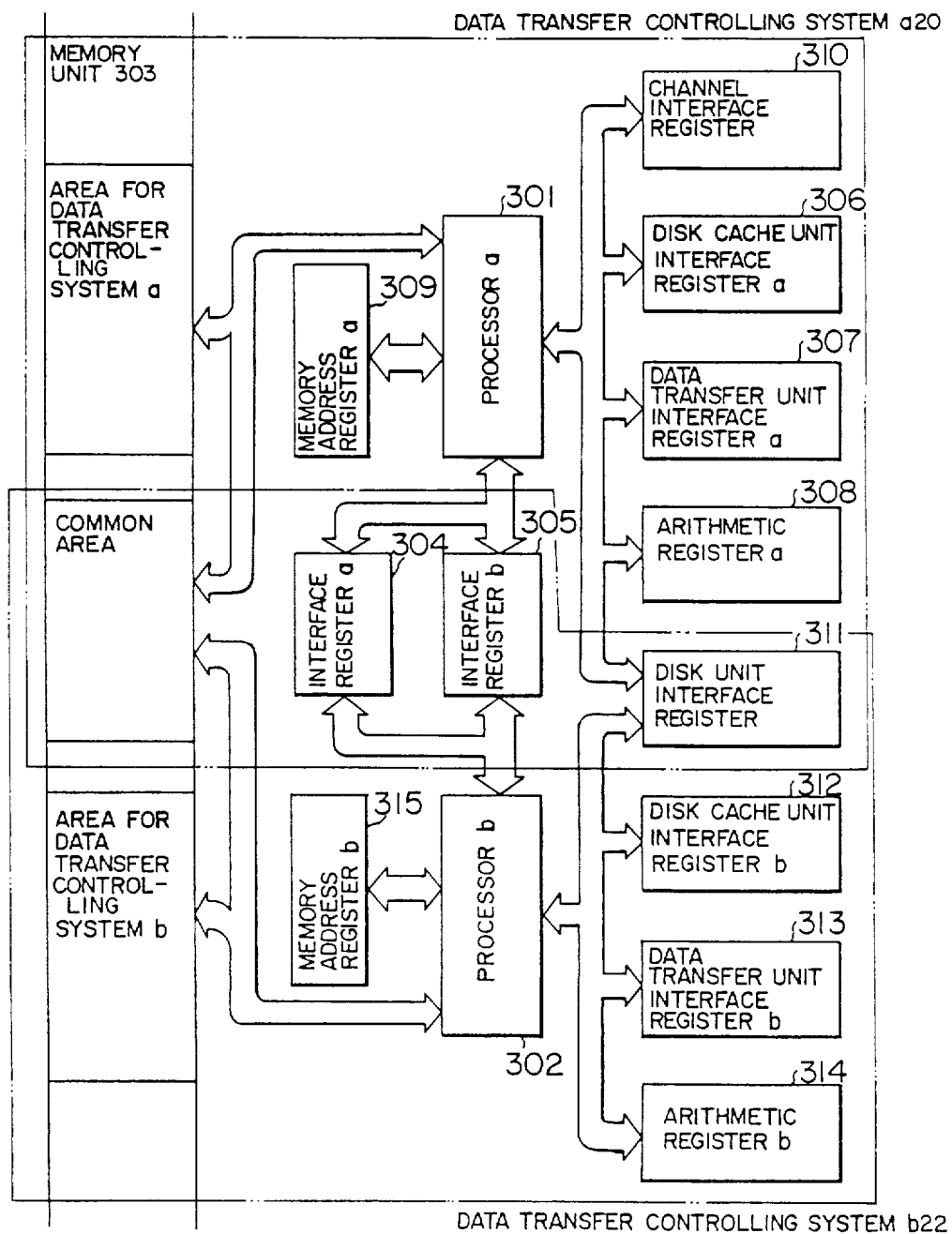
FIG. 3 is a schematic diagram illustrating a configuration including processors for realizing the data transfer controlling system a 20 and the data transfer controlling system b 22 shown in FIG. 2.

First, the multiprocessor system will be explained. FIG. 3 illustrates the configuration of the data transfer controlling systems a 20 and b 22. The data transfer controlling system a 20 includes a processor a 301, an area of a memory unit 303 for the data transfer controlling system a 20, and respective registers. The data transfer controlling system b 22 similarly comprises a processor b 302, an area of a memory unit 303 for the data transfer controlling system b 22, and respective registers. The physical interface between the data transfer controlling systems a 20 and b 22 are formed with an interface register a 304, an interface register b 305, and a common area in the memory unit 303. Each of the registers belonging to the processor a 301 will be explained. The register a 306 for interfacing the disk cache unit is used to communicate data with a disk cache unit 17 and to reference and update data in a directory 16. The register a 307 for interfacing the data transfer unit is used to issue a processing request to a data transfer unit a 21 and to receive a completion report from the same. An arithmetic register a 308 is used by the processor a 301 during control processing. A memory address register a 309 stores an address of a microprogram instruction in the memory unit 303, said microprogram instruction being stored to be executed by the processor a 301. That is, the processor a 301 fetches a microprogram instruction from the address of the memory unit 303 indicated by the memory address register a 309 and executes the pertinent processing. The channel interface register 310 is used to receive a processing request from the channel 25 and to report the completion of the processing request. If the data transfer controlling system a 20 has a function to communicate data with the disk unit group 18, the disk unit interface register 311 is shared between the processors a 301 and b 302. In other cases, the disk unit interface register 311 is not utilized. Next, the registers to be possessed by the processor b 302 will be explained. Corresponding to the registers a 306 to a 309, the processor b 302 has a disk cache unit interface register b 312, a data transfer unit interface register b 313, an arithmetic register b 314, and memory address register b 315. The methods for utilizing each register are the same as those in which the processor a 301 uses each of the registers a 301 to a 309, hence the explanations will be omitted. Since the data transfer controlling system b 22 does not communicate data with the channel 25, the channel interface register 311 is not adopted. If the data transfer controlling system a 20 does not communicate data with the disk unit group 18, the disk unit interface register 312 is dedicated to the processor b 302. If the data communication is to be conducted, the disk unit interface 312 is commonly used by the processors b 302 and a 301.

Figure 4:
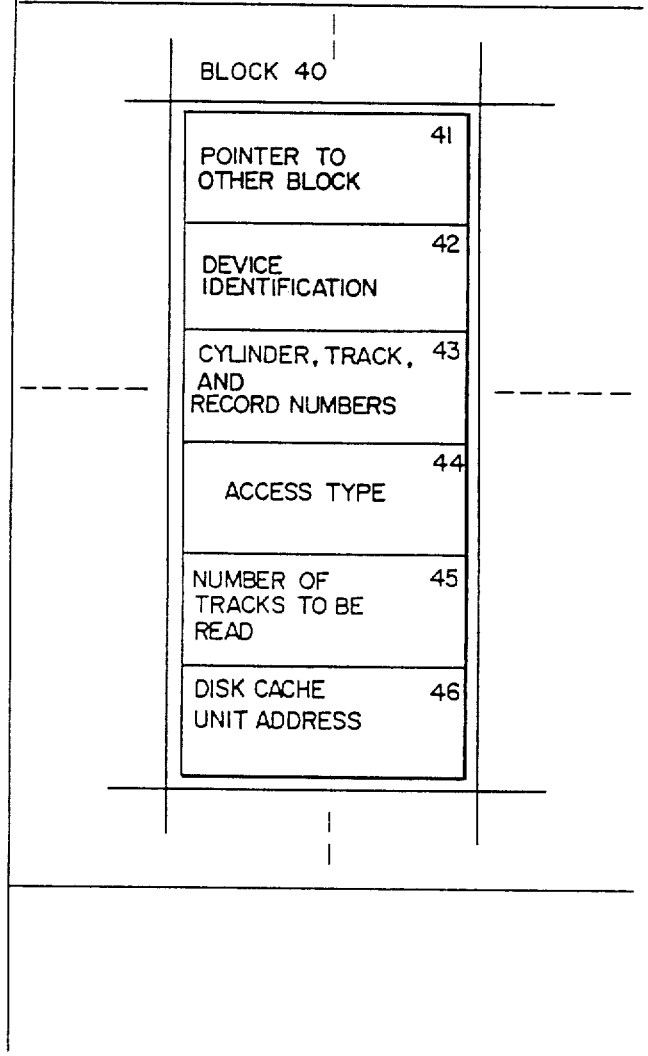
FIG. 4 illustrates the data layout of the common area in the memory unit shown in FIG. 3.

The memory unit 302 has an area for storing microprogram instructions and data for the data transfer controlling system a 20, an area for storing microprogram instructions and data for the data transfer controlling system b 22, and a common area. The contents of the microprogram for each transfer controlling system vary depending on the functions assigned to the transfer controlling system. Details about the microprogram will be described later in the present specification. The common area stores information to be exchanged between the data transfer controlling systems a 20 and b 22. The common area is constructed with a multiplicity of blocks 40 as depicted in FIG. 4. The configuration of the block 40 will be explained. The pointer 41 is used to link the block with other block. The device identification (ID) 42 represents a disk unit number of a disk unit specified for a data transfer among the disks of the disk unit group 18. A cylinder number, a track number, and a record number 43 (collectively) indicate the address of the object for an input/output processing in the disk unit. The access type 44 is used to recognize a read miss, write hit, write miss, or prefetch for a sequential read. The number of tracks to be read 45 stores the number of prefetched tracks and is meaningful when the access type 44 indicates a prefetching for a sequential read. The disk cache unit address 46 stores the address of the disk cache unit 17 specified for a data transfer. If a plurality of tracks are specified for the data transfer like in a prefetching of a sequential read in this case, a plurality of addresses are stored.

Figure 5:
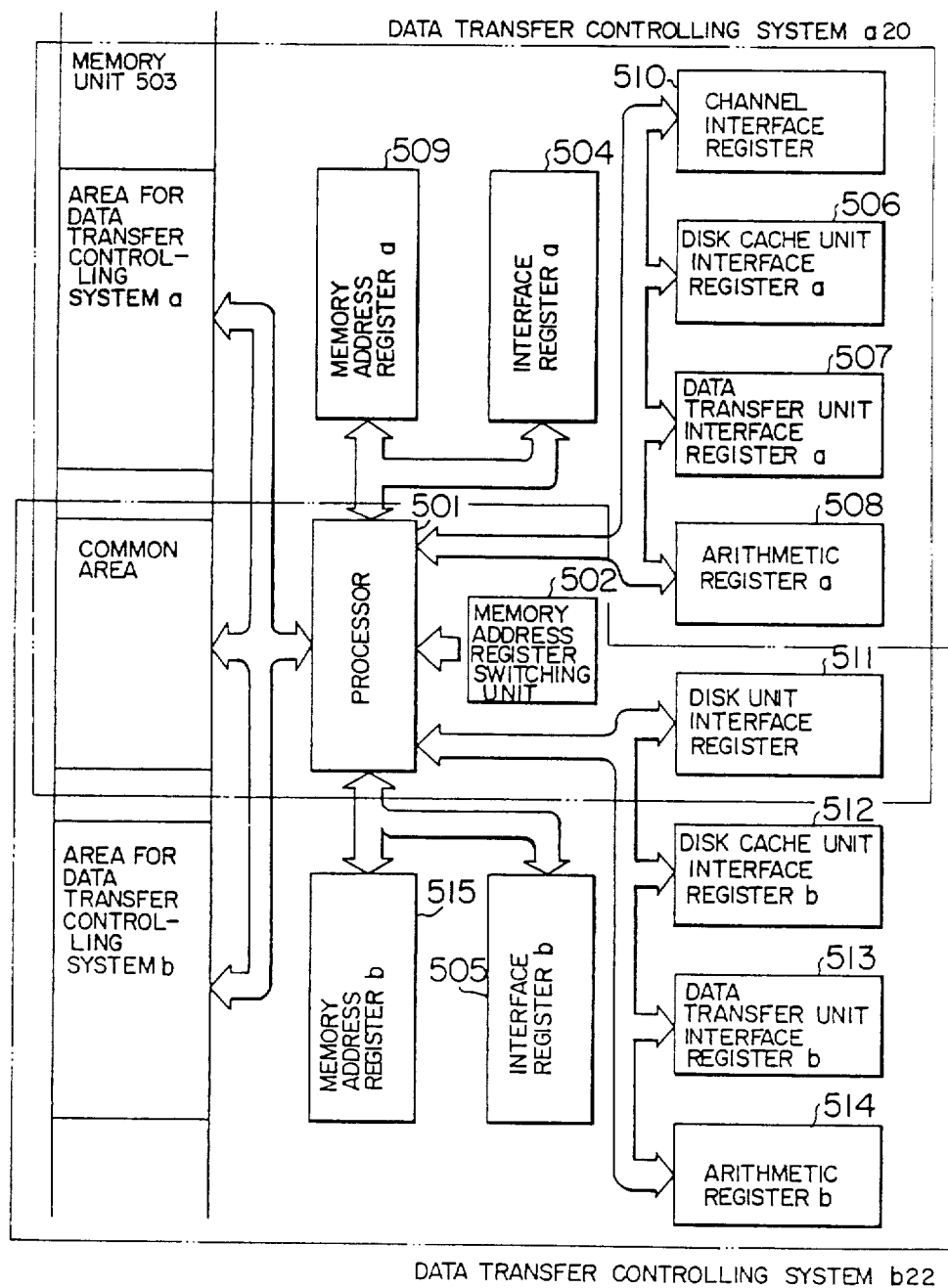
FIG. 5 depicts a schematic diagram illustrating a configuration including a processor for realizing the data transfer controlling systems a 20 and b 22 shown in FIG. 2.

FIG. 5 illustrates the multirun system configuration of the data transfer controlling systems a 20 and b 22. Different from the multiprocessor system configuration, only one processor 501 is provided and a memory address register switching unti 502 is added. The other features are the same as the multiprocessor system configuration, so the explanations thereof will be omitted. The memory address register switching unti 502 selects the effective memory address register by switching between the memory address registers each time an instruction is executed. The processor 501 fetches an instruction from an address stored in the effective memory address register and executes the instruction. The processor thus executes instructions alternately for the data transfer controlling systems a 20 and b 22, wherein an instruction is executed at a time. This means that the two data transfer controlling systems aparently operate at the same time.

Figure 6:
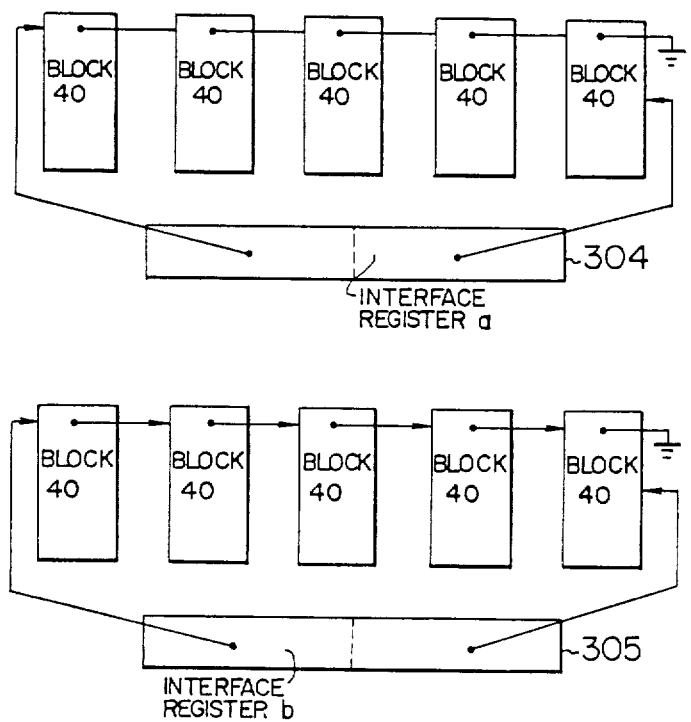
FIG. 6 illustrates the data layout of the data to be transferred between the data transfer controlling systems a 20 and b 22.

The interface configurations and the processing of the data transfer controlling systems a 20 and b 22 do not depend on whether the multiprocessor system or the multirun system is utilized. First, the interface configuration will be explained. The data transfer controlling system a 20 issues a processing request to the data transfer controlling system b 22 through the interface register a 304 (504) (the reference numeral enclosed in parentheses applies to the multirun system configuration hereinafter) and the common area in the memory unit 303 (503). On the other hand, the data transfer controlling system b 22 reports the processing completion to the data transfer controlling system a 20 through the interface register b 305 (505) and the memory unit 303 (503). FIG. 6 depicts the method for exchanging information between the respective data transfer controlling systems. Each block on the common area of the memory unti 303 (503) is linked by a pointer like a queue. The interface register a 304 (504) indicates the first and last blocks to be passed to the data transfer controlling system b 22 from the data transfer controlling system a 20. The interface register b 305 (505) indicates the first and last blocks to be passed to the data transfer system a 20 from the data transfer controlling system b 22. Each register is set to the null state if there exists no information to be exchanged. FIG. 7 depicts the method for transmitting data from the data transfer controlling system a 20 to the data transfer controlling system b 22. FIG. 7 (1) indicates the method applied to the data transfer controlling system a 20, whereas FIG. 7 (2) depicts that applied to the data controlling system b 22. First, the processing of the data transfer controlling system a 20 will be described. In the step 700, the interface register a 304 (504) is checked whether or not it is in the null state. If it is null, the address of the block currently being processed is stored in the areas of the interface registers a 304 that indicate the first and last blocks, respectively in the step 701. If it is not null, the address of the block currently being processed is stored in the area of the interface register a 304 that indicates the last block in the step 702. For an urgent processing, a high priority processing can be carried out by storing the pertinent address of the urgent processing in the area of the interface register that indicates the first block. Next, the operation of the data transfer controlling system b 22 will be clarified. In the step 703, the contents of the interface register a 304 (504) are checked to determine whether or not they are null. If the contents are null, other event to be processed is searched in the step 704. The concrete processing to search the event will be described later. If there exists no event to be processed, these two steps are executed repetitiously, otherwide, the processing of the event is carried out in the step 705 and control is returned to the step 703. If the contents of the interface register a 304 (504) are not null, the first block indicated by the relevant area of the interface register a 304 (504) is fetched in the step 706 to perform the necessary processing. Subsequently, the step 707 checks whether or not there exists other block to be processed. If no block is found, the interface register a 304 (504) is set to the null state in the step 708. Then, the requested processing is performed in the step 709 and control branches to the step 701. Since the same data is updated by the different processing systems in the processing explained above, an exclusive access controlling mechanism must be provided for executing the processing. FIG. 8 illustrates the method for transmitting data from the data transfer controlling system b 22 to the data transfer controlling system a 20. The difference from the configuration depicted in FIG. 7 is that the relationships for data transmission and reception are exchanged and that the interface register a 304 (504) is replaced with the interface register b 305 (505), hence the explanation will be omitted.

The processing of the data transfer controlling systems a 20 and b 22 does not depend on whether the multiprocessor system or multirun system is used. The processing of each data transfer controlling system is determined according to the functions assigned to the data transfer controlling system. The following paragraphs explain the relevant operations in the respective cases.

Figure 9:
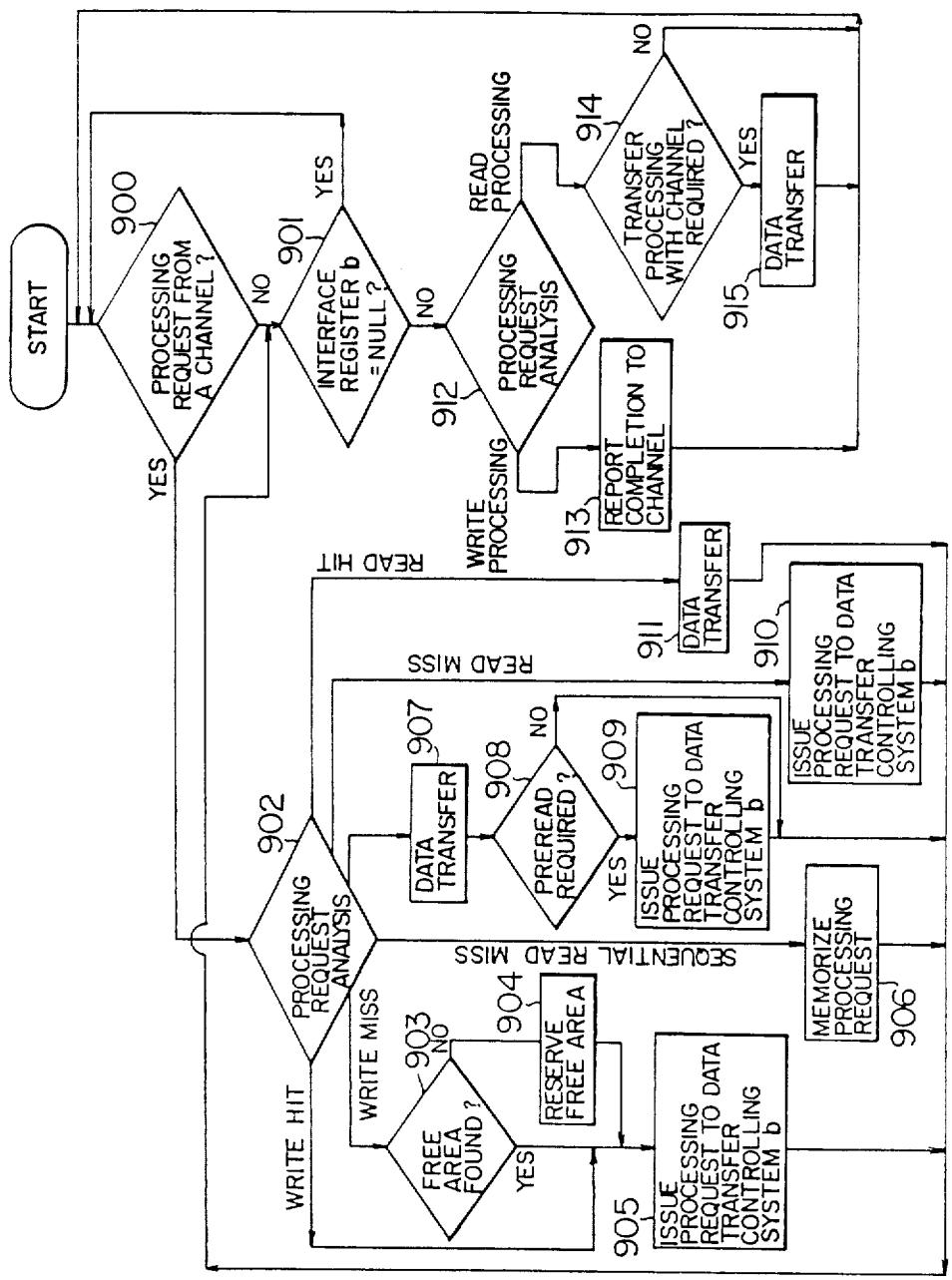
FIG. 9 illustrates the processing flowchart of the data transfer controlling system a 20.

First, the operations will be clarified for a case where the disk cache unit 17 is used as an intermediate buffer, the data transfer processing between the channel 25 and the disk cache unit 17 is assigned to the data transfer controlling system a 20, and the data transfer processing between the disk unit group 18 and the disk cache unit 17 is assigned to the data transfer controlling system b 22. FIG. 9 illustrates the processing flowchart of the data transfer controlling system a 20. The data transfer controlling system a 20 initiates processing when it receives an I/O request from the channel 25 or when it receives a processing completion report from the data transfer controlling system b 22. In the step 900, an I/O request from the channel side is checked through the channel interface register 310 (510). In the step 901, the interface register b 305 (505) is examined whether or not a processing completion report from the data transfer controlling system b 22 exists. When these processing are not required, a loop through the steps 900 and 901 is executed until a processing to be carried out occurs. If an I/O request from the channel 25 is received, control branches according to the received I/O request in the step 902. For analyzing information from the channel 25, information from the disk cache unit interface register a 306 (506) is received to judge whether the hit or miss is indicated by the information from the channel 25. This processing is carried out by the processor a 301 (processor 501) and arithmetic register a 308( 508). For a write miss, the step 903 is executed to determine whether or not a free buffer is found in the disk cache unit 17. If there is no free buffer, a free area is reserved according to the replacement algorithm in the step 904. The processing explained above is carried out by use of the disk cache unit interface register a 306 (506), the arithmetic register a 308 (508), the processor a 301 (processor 500), and so on. Next, a processing request is issued to the data transfer unit a 21 through the data transfer unit interface register a 307 (507) in the step 905 to cause the channel 25 to transfer data to the disk cache unit 18. Then, a processing request is issued to the data transfer controlling system b 22 via the interface register a 304 (504). Details about this operation have already been explained. After these write miss processing, control is passed to the step 901. For a write hit, since the data exists in the disk cache unit 17 in advance, control branches to the step 905 to perform the data transfer processing because the data need only be written in the pertinent location. The processing subsequent to this processing is the same as for the case of a write miss. for a sequential read, a processing request need not be issued to the data transfer controlling system b 22 in this stage even if a sequential read miss occurs because a preread (prefetch) request has already been issued. That is, if a miss is recognized in the step 902, the relevant processing request is memorized in an area of the memory unit 301 (503) allocated for the data transfer controlling system a 20 in the step 906, and the processing is terminated. For a hit, a processing request is issued to the data transfer unit interface register a 304 (504) via the data transfer unit a 21 in the step 907 to cause data transmission from the disk cache unit 18 to the channel 25. Furthermore, the processor a 301 (processor 501) checks whether or not a preread is necessary by use of the arithmetic register a 308 (508) in the step 908. If the preread is necessary, the processing request is issued to the data transfer controlling system b 22 through the interface register a 304 (504) in the step 908. When the processing above is completed, control is passed to the step 901. Next, the read processing other than the sequential read processing will be described. For a read miss, a processing request is issued to the data transfer controlling system b 22 via the interface register a 304 (504) in the step 910. For a read hit, the data transfer unti a 21 is caused to perform a data transfer between the disk cache unit 18 and the channel 25 through the data transfer unit interface register a 304 (504) in the step 911. When this processing is completed, control is returned to the step 901.

The processing to be executed by the data transfer controlling system a 20 when an I/O request from the channel 25 is received has been explained. Next, the processing to be executed by the data transfer controlling system a 20 when a processing completion report is received will be explained. First, the completion report is checked to determine whether it has been issued for a write processing or for a read processing in the step 912. If the completion report has been issued for a write processing, the processing completion is reported to the channel 25 via the channel interface register 310 (510) in the step 913. If the completion report has been issued for a read processing, the data or completion report stored in an area of the memory unit 303 (503) allocated to the data transfer controlling system a 20 is inspected to decide whether or not there exists any data to be sent to the channel 25 in the step 914. If such a data item is found, the data transfer unit a 21 is caused to perform a data transfer between the disk cache unit 17 and the channel 25 through the data transfer unit interface register a 307 (507) in the step 915. When the processing explained above is completed, control branches to the step 900.

Next, the processing of the data transfer controlling system b 22 will be explained. The data transfer controlling system b 22 starts the processing when it receives an I/O request from the data transfer controlling system a 20 or when it receives a completion report indicating that the positioning has been completed (that is, the read/write head has been positioned to the record to be accessed) in the disk unit selected for the data transfer from the disk unit group 19. First, the interface register a 304 (504) is checked in the step 1000 to determine whether or not a processing request from the data transfer controlling system a 20 exists. In the step 1001, the disk unit interface register 311 (511) is checked to determine a disk unit among the disk unit group 15 that has completed the head positioning. A loop through the steps 1000 and 1001 is executed repetitiously until another processing request is issued. If a processing request from the data transfer controlling system a 20 is received, the positioning request for the disk unit among the disk unit group 18 that is specified by the device ID 42 in the received block 60 is issued via the disk interface register 311 (511) in the step 1002. If a positioning completion report from a disk unit selected from the disk unit group 18 is received, the relevant block 40 is obtained by use of the arithmetic register b 314 (514) in the step 1003 to cause the data transfer unit b 23 to perform a data transfer processing according to the specified access type 44 between the disk cache unit 17 and the relevant disk unit selected from the disk unit group 18 through the data transfer unit interface register b 313 (513). For a write processing, the data obtained from the disk cache unit 17 is written in the pertinent disk unit in this case. For a read processing other than a sequential read processing, a 1-track data is stored in the disk cache unit 17. In a case of a sequential read, the data to be preread is stored in the disk cache unit 18, where the length of the data to be read is determined by the contents of the preread volume (number of tracks to be read) 45 of the block 40. When the read processing is completed, the directory 16 mutt be updated through the disk cache unit interface register b 312 (512). Whether or not the directory must be updated is judged in the step 1004 and the relevant processing is executed in the step 1005. After the processing explained above is completed, the completion report is issued to the data transfer controlling system a 20 through the interface register b 305 (505) in the step 1006, then control is passed to the step 1006.

The processing of the respective data transfer controlling systems has been explained for the case where the data transfer processing between the channel 25 and the disk cache unit 17 is assigned to the data transfer controlling system a 20 and for the case where the data transfer processing between the disk cache unit 17 and the disk unit group 18 is assigned to the data transfer controlling system b 22. Next, the processing will be explained for a case where the processing for the read hit and write miss, the data transfer processing between the channel 25 and the disk cache unit 17 for a write hit, and the processing to simultaneously send the data to be transferred to the channel to the disk cache unit 17 and the channel 25 are assigned to the data transfer controlling system a 20; and the data transfer processing between the disk cache unit 17 and the disk unit group 18 for a write hit, the processing for transferring the 1-track data other than the data requested by the channel 25 for a read miss, and the preread processing for a sequential read are assigned to the data transfer controlling system b 22. In this case, there are two methods for configuring these data transfer controlling systems: A method for configuring by assigning the function to receive the interrupt completion report of a positioning completion from the disk unit group 18 is assigned to the data transfer controlling systems a 20 and b 22 and a method for configuring by assigning the function only to the data transfer controlling system a 20. First, the latter will be explained.

Figure 11:
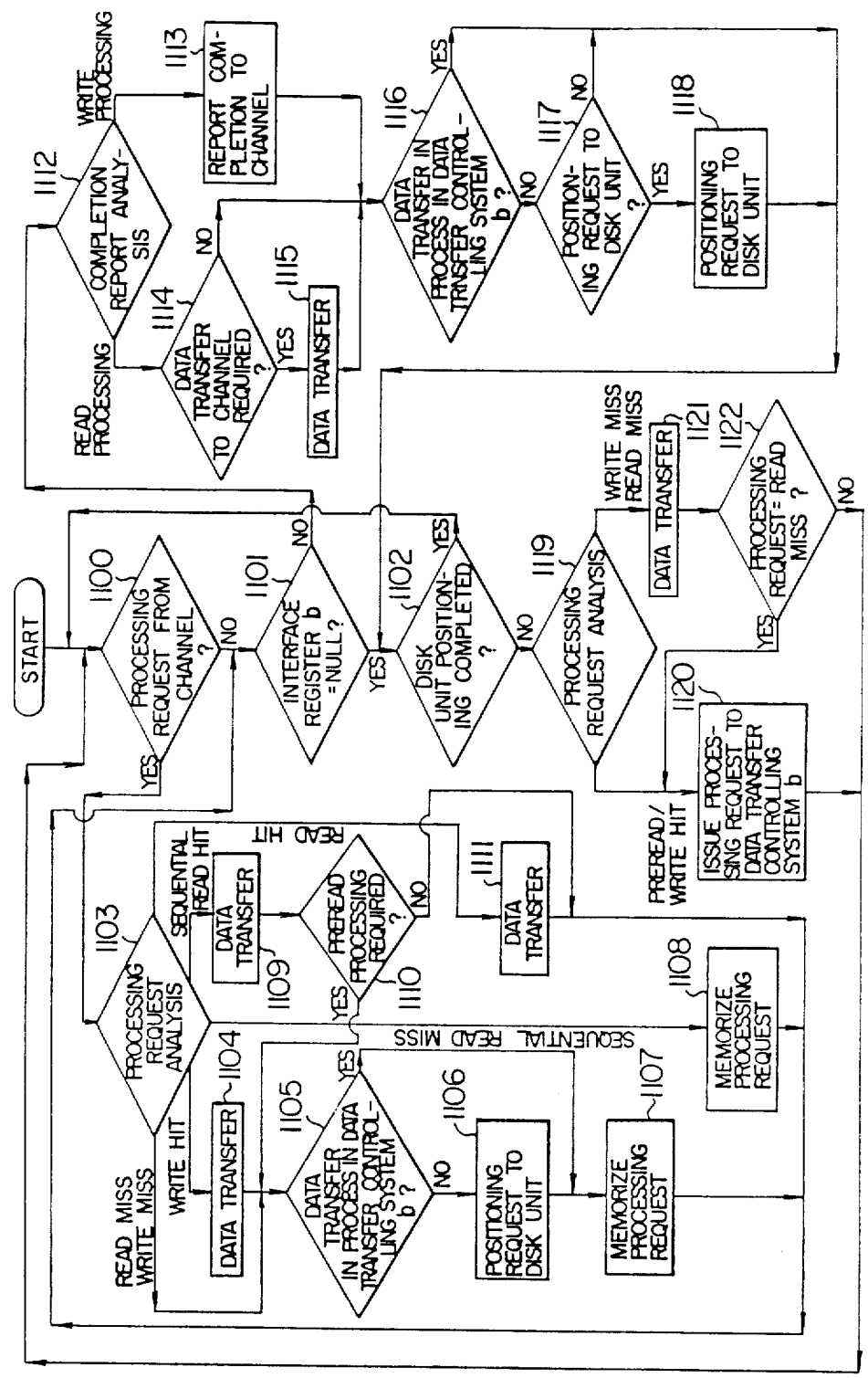
FIG. 11 depicts the processing flowchart of the data transfer controlling system a 20 in a case where a positioning completion report from the disk unit group 18 is received only by the data transfer controlling system a 20.

FIG. 11 illustrates the processing flowchart of the data transfer controlling system a 20. The data transfer controlling system a 20 initiates processing when a positioning operation of the disk unit group 18 is completed in addition to the two initiating factors depicted in FIG. 9. The steps 1100 and 1101 corresponds to the steps 900 and 901 in the FIG. 9. Moreover, the positioning operation of the disk unit group 18 is checked through the disk interface register 311 (511) in the step 1102 to determine whether or not the positioning operation has been completed. A loop through the steps 1100 to the step 1102 is executed repetitiously until another processing request is issued. If a processing request from the channel 25 is received, the processing request is classified in the step 1103. This processing corresponds to that of the step 902 shown in FIG. 9. For a write hit, the same processing as illustrated in FIG. 9 is executed. That is, the data transfer unit a 21 is caused to transfer data from the channel 25 to the disk cache unit 17 in the step 1104 which corresponds to the step 905 depicted in FIG.-9. The processing thereafter is entirely the same as for the write miss processing. For a write miss, unlike the case illustrated in FIG. 9, it is checked whether or not a data transfer is taking place in the data transfer controlling systems b 22 through the disk unit interface register 311 (511) in the step 1105. If the data transfer is in process, control jumps to the step 1107, otherwise, a positioning request is issued to the disk unit selected for an input/output processing from the disk unit group 18 in the step 1106.

In the step 1107, the information indicating that the processing (positioning) request has been received is stored in a data area of the memory unit 303 (503) allocated to the data transfer controlling system a 20, then control is passed to the step 1101. Even if the positioning request cannot be issued to the disk unit group 19, the relevant event is also memorized. For a sequential processing, most processing steps are the same as for the case illustrated in FIG. 9. The steps 1108, 1109, and 1110 correspond to the steps 906, 907, and 908 of FIG. 9, respectively. However, if a preread is necessary, unlike in the case depicted in FIG. 9, control jumps to the step 1105 and the same processing as for the case of a write miss is carried out, then control returns to the step 1101. For a read hit in a read processing other than a sequential read processing, completely the same processing as for the case shown in FIG. 9 is executed. The step 1111 corresponds to the step 911 of FIG. 9. For a read miss on the other hand, unlike for the case illustrated in FIG. 9, the steps 1105, 1106, and 1107 which are entirely the same as for the case of a write miss are carried out, then control is passed to the step 1101.

Next, the processing to be executed when a processing completion report from the data transfer controlling system b 22 is received will be described. The processing in this case is almost the same as for that illustrated in FIG. 9. The steps 1112, 1113, 1114, and 1115 correspond to the steps 912, 914, 915, and 916 of FIG. 9, respectively. In the step 1116 after the step 1115, it is checked whether or not a data transfer is taking place in the data transfer controlling system b 22. If this is not the case, the area of the memory 303 (503) allocated to the data transfer controlling system a 20 is checked in the step 1117. If a positioning request for the disk unit 18 that could not be issued before, this positioning request is issued in the step 1118.

Next, the processing to be executed when a positioning operation of a disk unit selected from the disk unit group 18 is completed will be clarified. In the step 1119, the pertinent block 40 is obtained by use of the arithmetic register a 308 (508) and control branches according to the access type 44. For a preread of a sequential read or a write hit, the processing request is issued to the data transfer controlling system b 22 through the interface register a 304 (504) in the step 1120. For a write miss or a read miss, the data transfer controlling system a 21 is caused to perform or data transfer processing via the data transfer unit interface register a 307 (507) in the step 1121. In a case of a read miss however, the data requested by the channel 25 is simultaneously transferred from the disk unit selected for the access from the disk unit group 18 to the channel 25 and the disk cache unit 17. For a write miss, the data is obtained from the channel 25 and is written in the disk unit selected for the access from the disk unit group 18. This step ends the processing for a write miss, and control need only return to the step 1100. In a case of a read miss, a processing request must be issued to the data transfer controlling system b 22 to read the unread data remaining on the same track and to store it in the disk cache unit 17. For this purpose, it is checked whether a read miss has occurred in the step 1122. If a read miss is found, control jumps to the step 1120.

Figure 12:
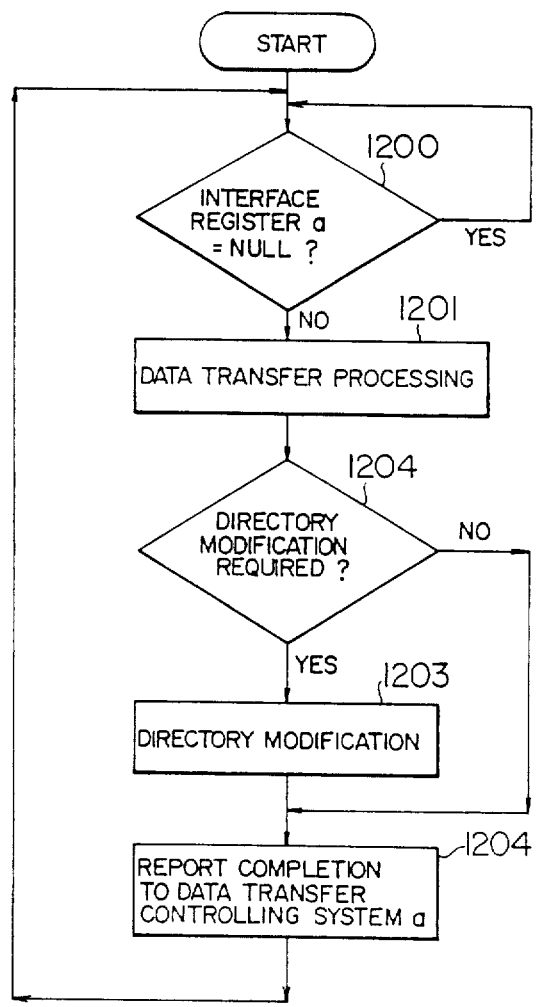
FIG. 12 illustrates the processing flowchart of the data transfer controlling system b 22 in a case where the assignments of the functions for transferring data and the functions for receiving the positioning completion report from the disk unit group 18 are the same as illustrated in FIG. 11.

FIG. 12 illustrates the flowchart of the data transfer controlling system b 22. In this case, different from that shown in FIG. 10, the data transfer controlling system b 22 must initiate a processing execution when it receives a processing request from the data transfer controlling system a 20. Since the positioning operation of the disk unit group 18 has been completed, the data transfer processing is commenced immediately. In the step 1200, it is inspected whether or not a processing request from the data transfer controlling system a 20 exists by use of the interface register a 304 (504). If the processing request is found, the data transfer processing is activated in the step 1201. The data transfer controlling system b 23 is caused to perform the data transfer processing through the data transfer unit interface register a 313 (513). In this case, the data transfer processing is performed for the write hit, read miss, or sequential read preread processing. The processing to be executed for the write hit or sequential read preread processing is entirely the same as that illustrated in FIG. 10. For a read miss, the 1-track data transfer is used in the case depicted in FIG. 10. In this case, however, the 1-track data excepting the data directly requested by the channel 25 is obtained from the disk unit selected for the access from the disk unit group 18 and is stored in the disk cache unit 17. The processing thereafter is completly the same as for the case depicted in FIG. 10. The steps 1202-1205 correspond to the steps 1104-1107 in FIG. 10, respectively. After the processing above is carried out, control is returned to the step 1200.

Figure 13:
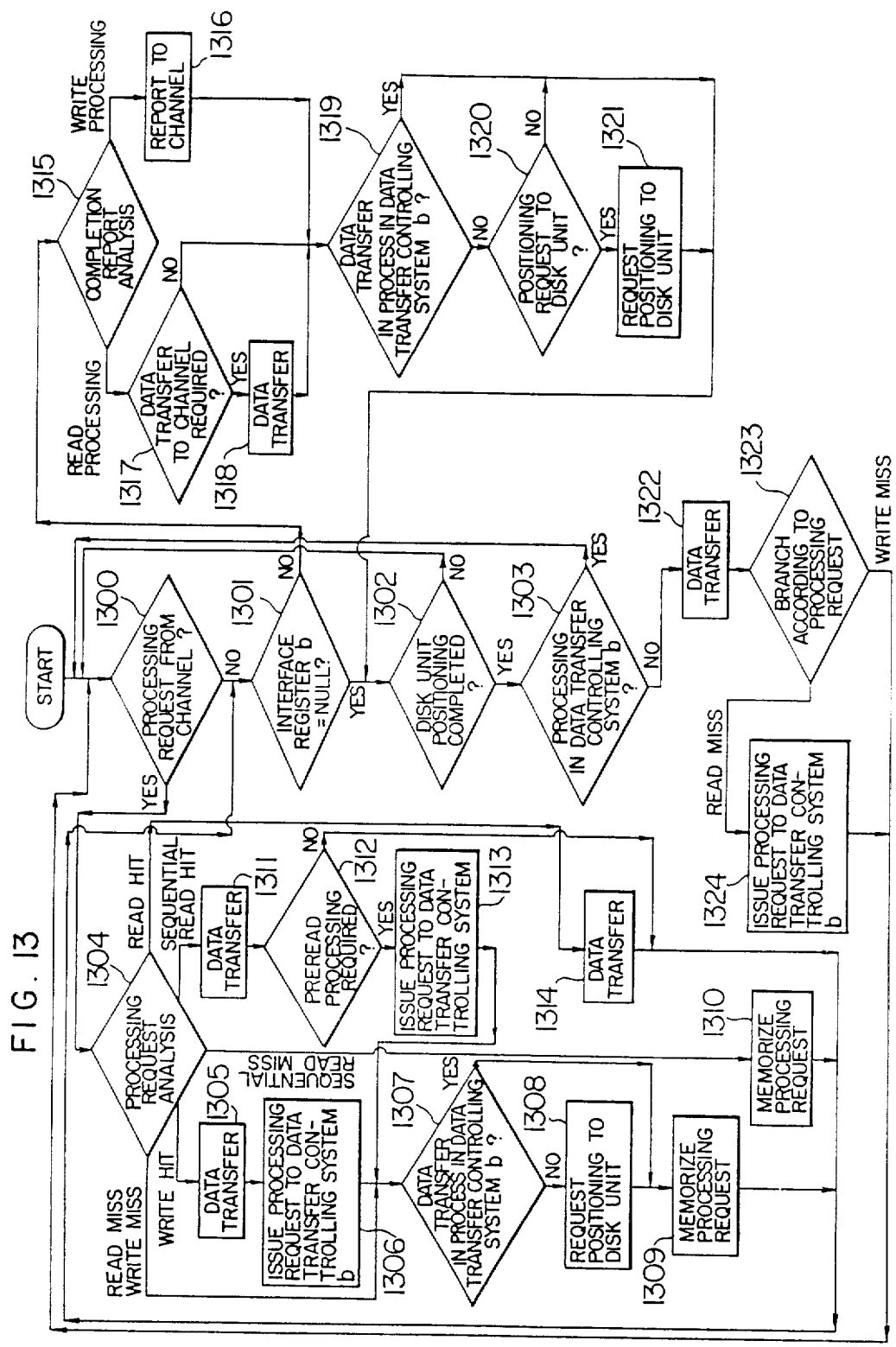
FIG. 13 depicts the processing flowchart of the data transfer controlling system b 22 in a case where the assignment of the functions for transferring data are the same as illustrated in FIG. 11, but the positioning completion report from the disk unit group 18 is given to the data transfer controlling systems a 20 and b 22.

The operations explained hereabove apply to the case where the function for receiving a positioning completion report from the disk unit group 18 is assigned only to the data transfer controlling system a 20. Next, explanations will be given for the case where the function for receiving a positioning completion report from the disk unit group 18 is assigned to the data transfer controlling systems a 20 and b 22. FIG. 13 depicts the processing flowchart of the data transfer controlling system a 20. Only the difference from that illustrated in FIG. 11 will be explained. When the positioning completion report from the disk unit group 19 is recognized through the disk unit interface register 311 (511), the pertinent processing is immediately started in the case shown in FIG. 11. In this case however, it may be probable that the processing must be performed by the data transfer controlling systme b 22; therefore, the relevant condition is checked in the step 1303. Next, each processing will be explained. If an I/O request from the channel 25 is received, the processing for a read hit, read miss, or write miss is entirely the same as for the case shown in FIG. 11. In this case, the steps 1307, 1308, and 1309 correspond to the steps 1105, 1106, and 1107 of the FIG. 11, respectively. The step 1314 corresponds to the step 1111 illustrated in FIG. 11. For a write hit, the data transfer portion is the same as depicted in the step 1305 that corresponds to the step 1104 of FIG. 11. However, in the step 1306, an I/O request is issued to the data transfer controlling system b 22 through the interface register a 304 (504). The processing thereafter is completely the same as for the case shown in FIG. 11 because control jumps to the step 1307. Next, the processing in a case of a sequential read will be explained. The difference in this case is that a processing request is issued to the data transfer controlling system b 22 through the interface register a 304 (504) in the step 1313 if it is recognized that a preread is necessary. The processing after this point is entirely the same as for the case of FIG. 11 because control jumps to the step 1307. In this case, the steps 1310-1312 correspond to the steps 1108-1110 of FIG. 11, respectively.

Next, the processing to be executed in a case where a processing completion report from the data transfer controlling system b 22 is received will be explained. In this case, the processing is completely the same as illustrated in FIG. 11. The steps 1315-1321 correspond to the steps 1112-1118 of FIG. 11, respectively.

Next, the processing to be executed in a case where a positioning completion report from the disk unit group 19 is received will be explained. The data transfer controlling system a 20 receives the report only for a write miss or a read miss, whereas the data transfer controlling system b 22 receives the report for other cases. The data transfer processing is carried out in the step 1322. This processing is wholly the same as that explained about the step 1121. After this processing is carried out, the processing is terminated for a write miss. In a case of a read miss, the relevant condition is judged in the step 1323. In the step 1324, a processing request is issued to the data transfer controlling system b 22 through the interface register a 304 (504) to read the data on the same track and to store it in the disk cache unit 17. In this case, since each disk of the disk unit group 18 is rotating, the processing request is placed as the first item of the queue depicted in FIG. 6 so that the processing is not delayed.

Figure 10:
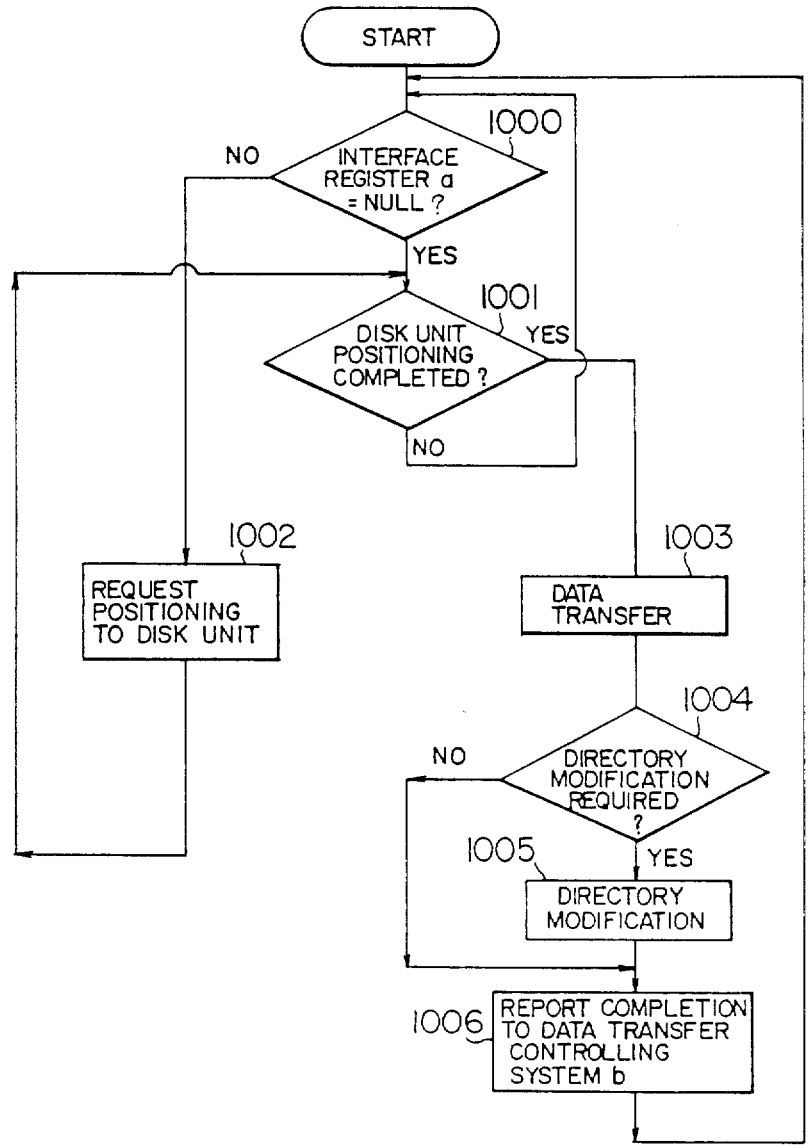
FIG. 10 is the processing flowchart of the data transfer cotnrolling system b 22 provided with the data transfer functions shown in FIG. 9.
Figure 14:
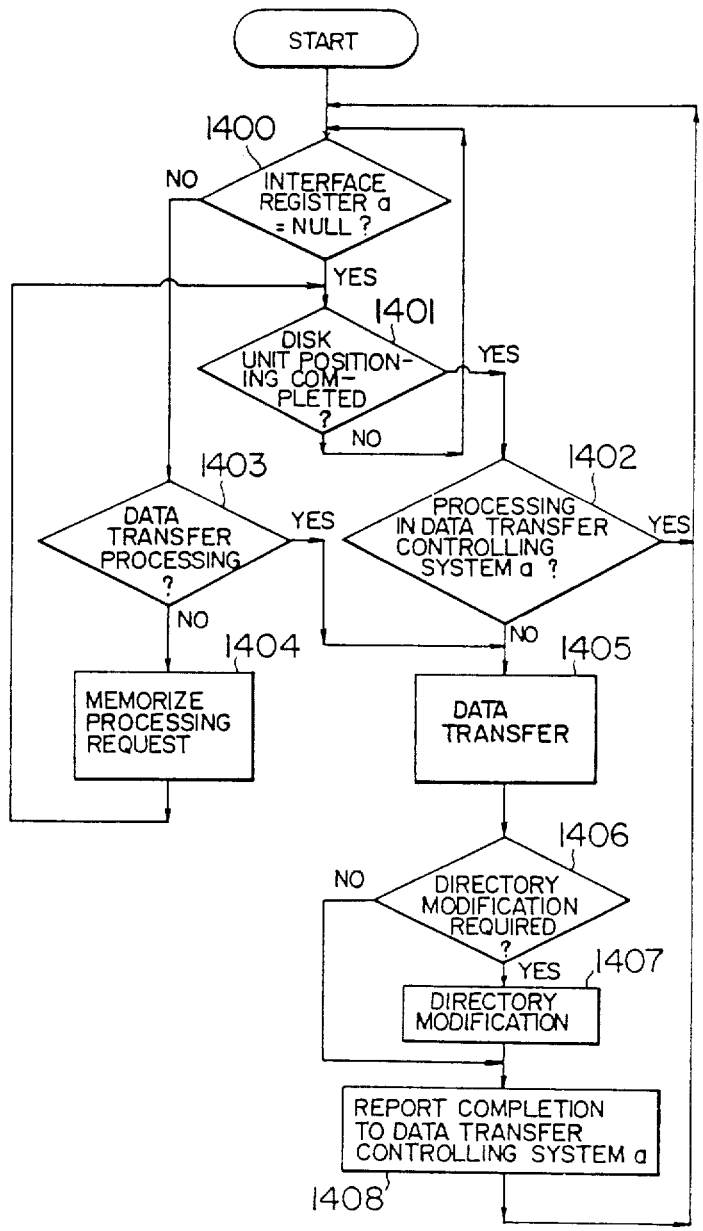
FIG. 14 is the processing flowchart of the data transfer controlling system b 22 in a case where the assignments of the functions for transferring data and the functions for receiving the positioning completion report from the disk unit group 18 are completely the same as those shown in FIG. 13.

FIG. 14 illustrates the processing flowchart of the data transfer controlling system b 22. In this case, the data ,transfer controlling system b 22 must execute processing in the same occasions as illustrated in FIG. 10, that is, when a processing request from the data transfer controlling system a 20 is received or when a positioning is completed in a disk unit selected from the disk unit group 19. Therefore, the steps 1400–1401 corresponds to the steps 1000–1001. However, in a case of a write miss or a read miss, since the pertinent processing must be performed by the data transfer controlling system a 20 in this case, the conditions for the write miss and the read miss are checked in the step 1402. Next, the processing to be executed when a processing request from the data transfer controlling system a 20 is received will be explained. First, in the step 1403, it is checked whether or not the processing request includes the processing for reading the data on the same track excepting the data requested by the channel 25 when a read miss occurs. If this is the case, control jumps to the step 1405 to start the data transfer processing; otherwise, in the step 1404 the block 40 in which the information indicating that a disk unit positioning request is already issued for a disk unit selected from the disk unit group 19 is stored is fetched from the queue illustrated in FIG. 6 to perform a write hit processing or a sequential read preread processing, then control returns to the step 1401. When a positioning completion report from the disk unit selected from the disk unit group 19 is received, the relevant data transfer processing is carried out in the step 1405. The data transfer processing in the step 1405 is used for the read miss, write hit, or sequential read preread processing. This processing is completely the same as the processing in the step 1201 of FIG. 12. The operation has already been explained, hence the explanation about this operation will be omitted. The subseuent steps 1406–1408 are also the same as the steps 1202–1204 of FIG. 12. After these steps are carried out, control is passed to the step 1400.

Next, the processing will be explained for a case where the sequential read prepread processing and the processing portion of the read miss processing for transferring the 1-track data excepting the data requested by the channel 25 are assigned to the data transfer controlling system b 22 and the other processing is assigned to the data transfer controlling system a 20. When compared with the cases depicted in FIGS. 11–14, the processing is the same in this case except for that the write hit processing is wholly assigned to the data transfer controlling system a 20. In this case, there are also two methods for configuring the data transfer controlling systems: A method for configuring by assigning the function for receiving a positioning completion report from the disk unit group 18 only to the data transfer controlling system a 20 and a method for configuring the function for receiving a positioning completion report from the disk unit group 18 to the data transfer controlling systems a 20 and b 22. First, the former case will be explained.

Figure 15:
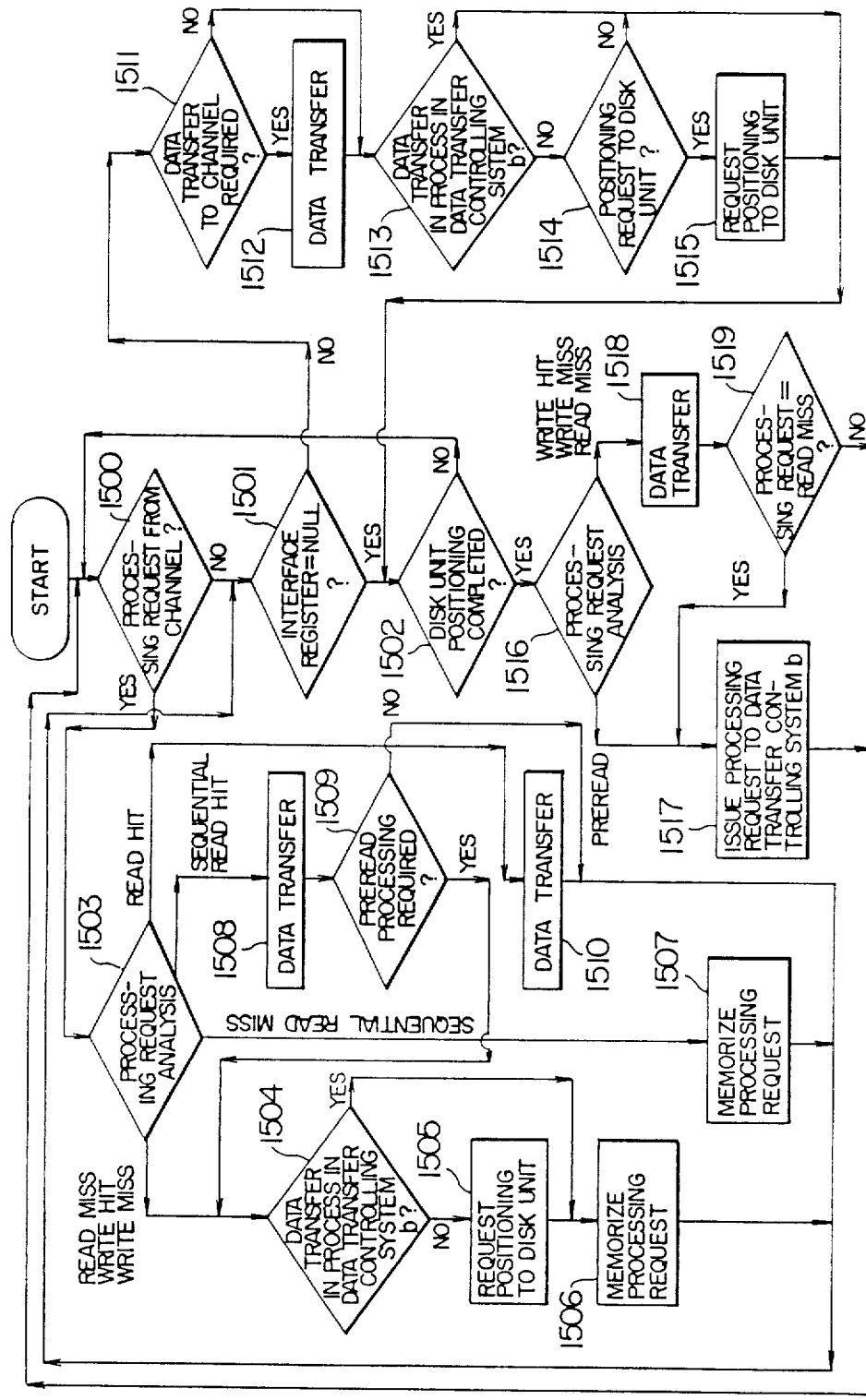
FIG. 15 depicts the processing flowchart of the data transfer controlling system a 20 in a case where the functions for prefetching of a sequential read and the functions for writing the data from tracks specified to be accessed except for the data directly requested by the channel 25 in the disk cache unit 17 are assigned to the data transfer controlling system b 22 and the other data transfer functions are assigned to the data transfer controlling system a 20.

FIG. 15 depicts the processing flowchart of the data transfer controlling system a 20. For this case, only the difference from that illustrated in FIG. 11 will be described. When a write hit request from the channel 25 is received in the case shown in FIG. 11, a data transfer from the channel 25 to the disk cache unit 17 is performed. In this case however, the data transfer processing is rot performed and only the same processing as for the case of a write miss is carried out. In FIG. 11, when a positioning completion report from the disk unit group 18 is received, a processing request is issued to the data transfer controlling system b 22 for a write hit; however, the data transfer controlling system a 20 conducts this processing. The data transfer unit a 21 is caused to carry out the data transfer processing through the data transfer unit interface register a 307 (507). In this processing, the data received from the channel 25 is written in the disk unit selected as the input/output unit from the disk unit group 19 and in the disk cache unit 17 at the same time. Further, the data transfer controlling system a 20 performs the relevant processing for the write processing and a completion report of a write processing is not received from the data transfer controlling system b 22; consequently, it is unnecessary to check whether or not a completion report is issued for a write processing and thus to execute the corresponding processing.

Figure 16:
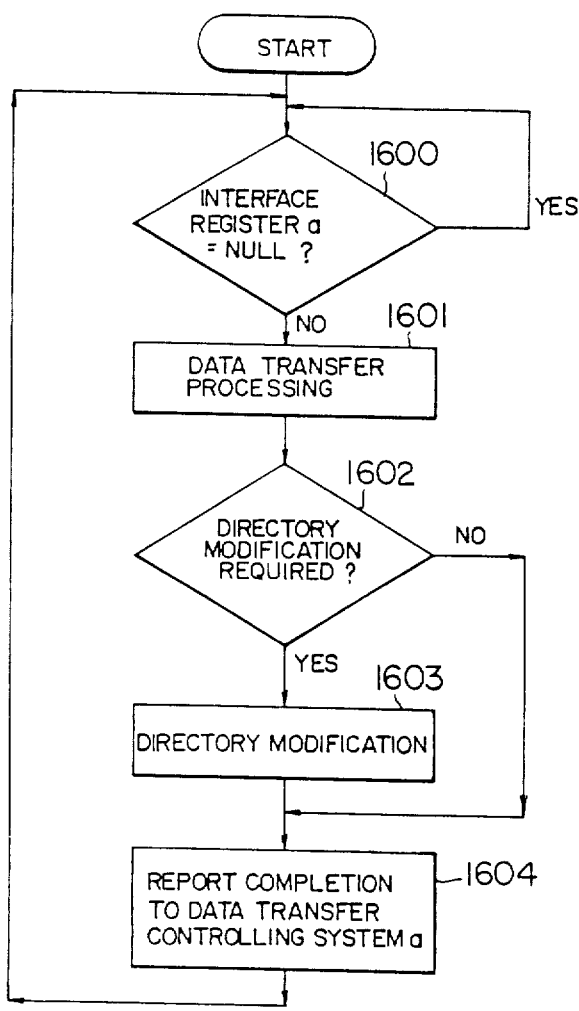
Fig. 16 illustrates the processing flowchart of the data transfer controlling system b 22 in a case where the assignemnts of the functions for transferring data and the functions for receiving the positioning completion report from the disk unit group 18 are the same as shown in FIG. 15.

FIG. 16 illustrates the processing flowchart of the data transfer controlling system b 22. Although the processing flowcharts are completely the same in this drawing level as shown in FIGS. 16 and 12, the data transfer processing to be carried out in FIG. 16 does not include the processing for the case of a write hit, but FIG. 12 covers the processing for the case of a write hit. The data transfer processing of FIG. 16 is provided for a read miss and sequential read preread processing. This processing has already clarified in conjunction with the step 1201 of FIG. 12, hence the further explanation will be omitted.

Figure 17:
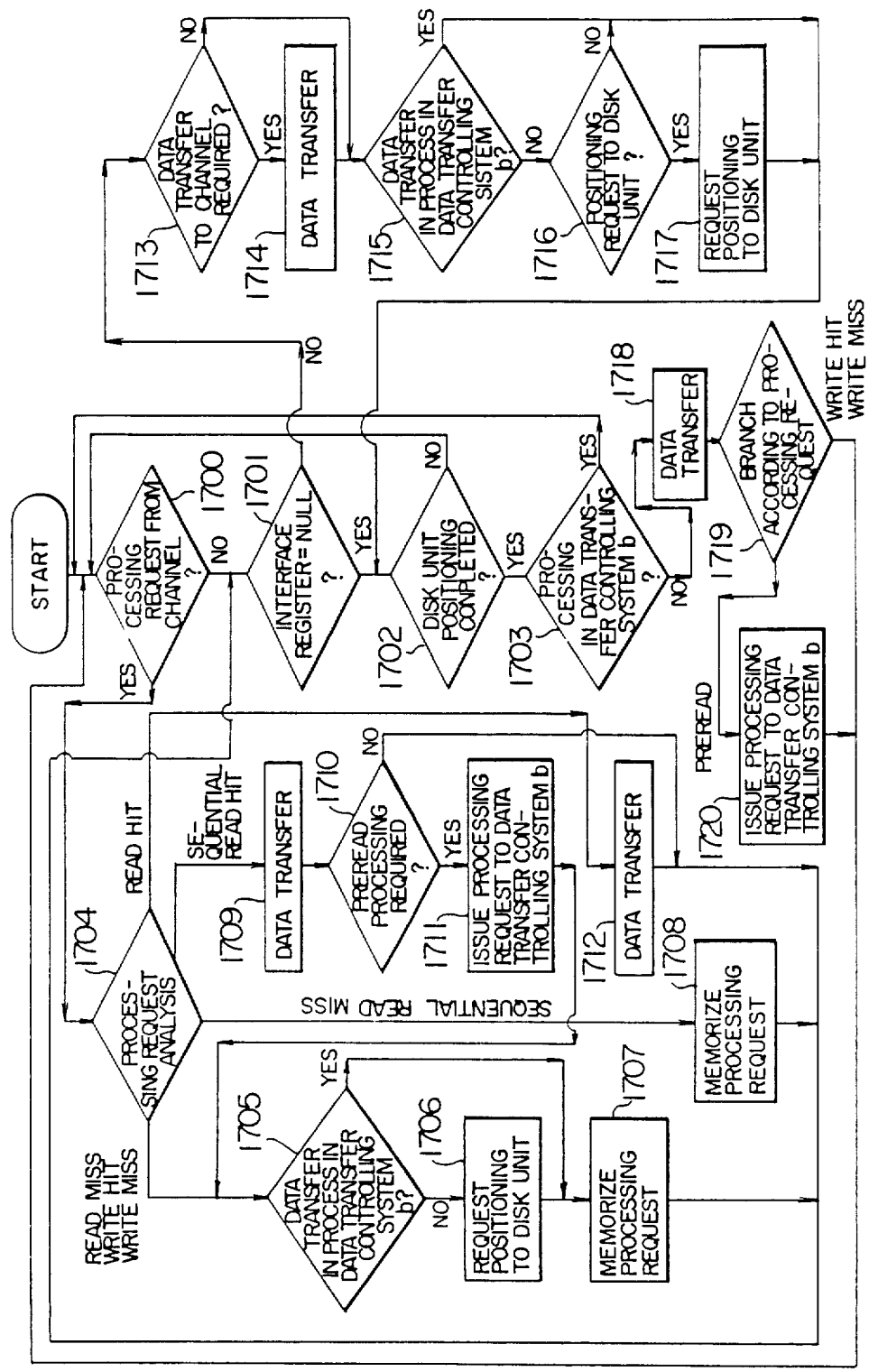
FIG. 17 depicts the processing flowchart of the data transfer controlling system b 22 in a case where the assignment of the functions for transferring data is the same as that shown in FIG. 15, but the positioning completion report from the disk unit group 18 is given to the data transfer controlling systems a 20 and b 22.

The processing to be carried out in the case where the function for receiving a positioning completion report from the disk unit group 18 is assigned only to the data transfer controlling system a 20 has been explained. Next, the processing to be performed in the case where the function for receiving a positioning completion report from the disk unit group 18 is assigned to the data transfer controlling systems a 20 and b 22 will be described. FIG. 17 illustrates the processing flowchart of the data transfer controlling system a 20. For this case, only the difference from that illustrated in FIG. 13 will be explained. The difference between FIG. 17 and FIG. 13 is wholly the same as that between FIG. 15 and FIG. 11. These points are as follows. First, the processing to be executed for a write hit request received from the channel 25 is the same as that for a write miss. Next, the data transfer controlling system a 20 carries out the relevant processing when a positioning completion report received from the disk unit group 18 indicates a write hit. Finally, the processing to be executed for a write processing completion report received from the data transfer controlling system b 22 is unnecessary because the write processing completion report is not received from the data transfer controlling system b 22.

Figure 18:
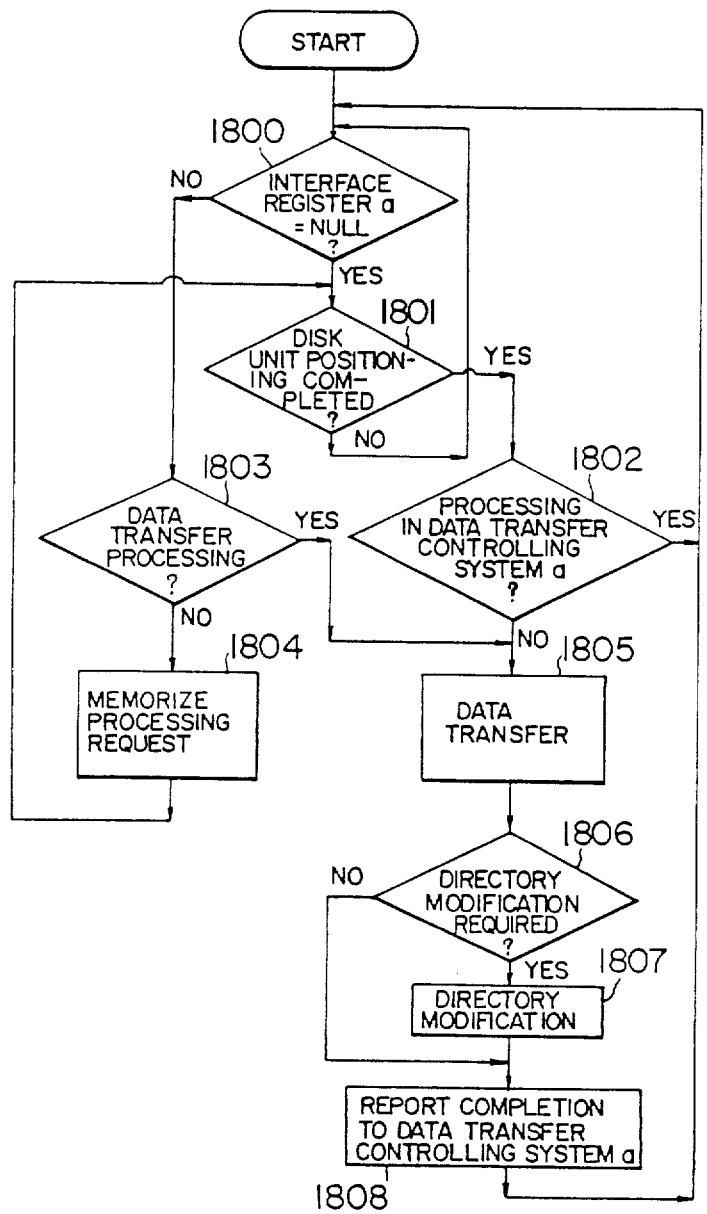
FIG. 18 illustrates the processing flowchart of the data transfer controlling system b 22 in a case where the assignments of the functions for transferring data and the functions for receiving the positioning completion report from the disk unit group 18 are the same as shown in FIG. 17.

FIG. 18 illustrates the processing flowchart of the data transfer controlling system b 22. FIGS. 18 and 14 are identical in this drawing level. The difference between FIG. 18 and FIG. 14 is entirely the same as that between FIG. 16 and FIG. 12. That is, the data transfer controlling system b 22 does not carry out the pertinent processing for a write hit.

Figure 19:
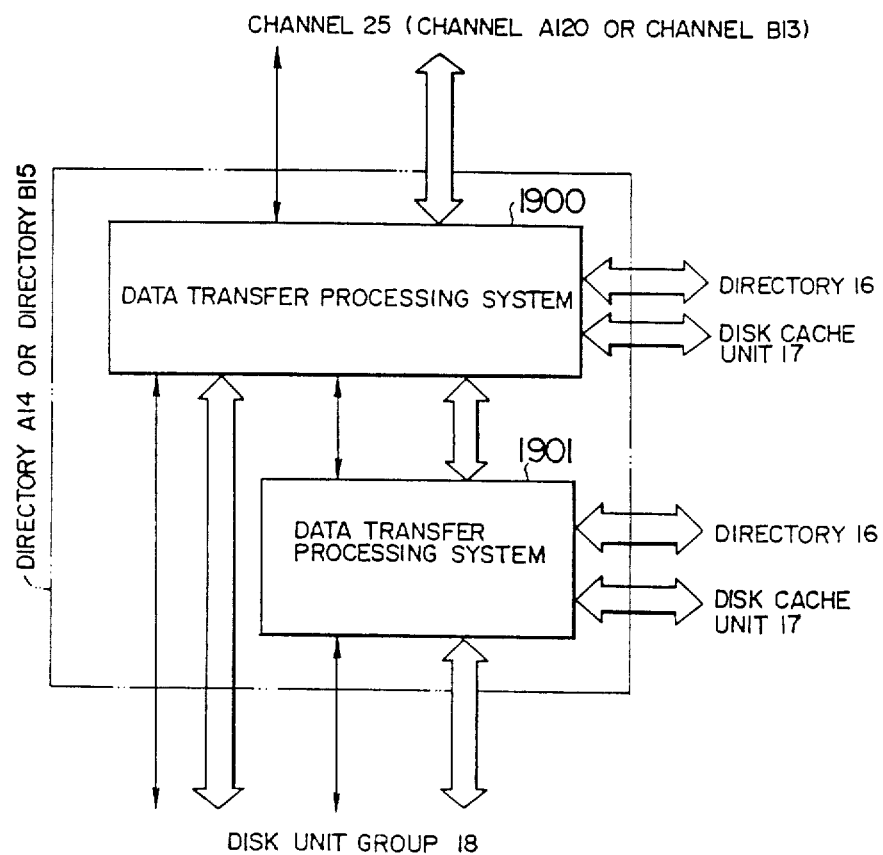
FIG. 19 is a block diagram illustrating another method for configuring the director means.

Finally, the processing to be executed in a case where the director A 14 (director B 15) is configured with two data transfer processing systems. FIG. 19 depicts the block diagram of this configuration. The director A 14 (director B 15) comprises a data transfer processing system a 1900 and a data transfer processing system b 1901. FIG. 20 shows the details of the block diagram depicted in FIG. 19. In this case, since the data transfer function is included in each data processing system, the multirum system is meaningless. The configuration of FIG. 20 is the same as that shown in FIG. 3 excepting that the data transfer interface registers a 307 and b 313 are not found in FIG. 20 because the data transfer units are eliminated. In this case however, the data transfer is possible by combining the microprogram instructions stored in the areas of memory unit 2003 that are allocated to the respective data transfer processing systems with the functions of the processors a 2001 and b 2002. The interfaces between each data transfer processing system can be realized in the same way as depicted in FIG. 6 to FIG. 8. Also in the cases shown in the processing flowcharts in FIGS. 9 to 18, the processing is identical to that of this case excepting that the data transfer processing in the respective diagrams is carried out by the respective data transfer processing systems.

EFFECTS OF THE INVENTION

Figure 21:
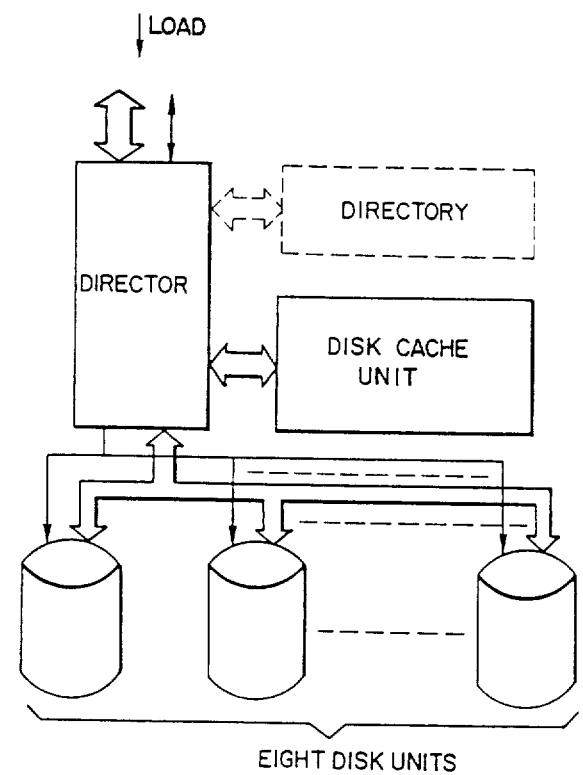
FIG. 21 shows a simulation model utilized for confirming the effects of the present invention.
Figure 22:
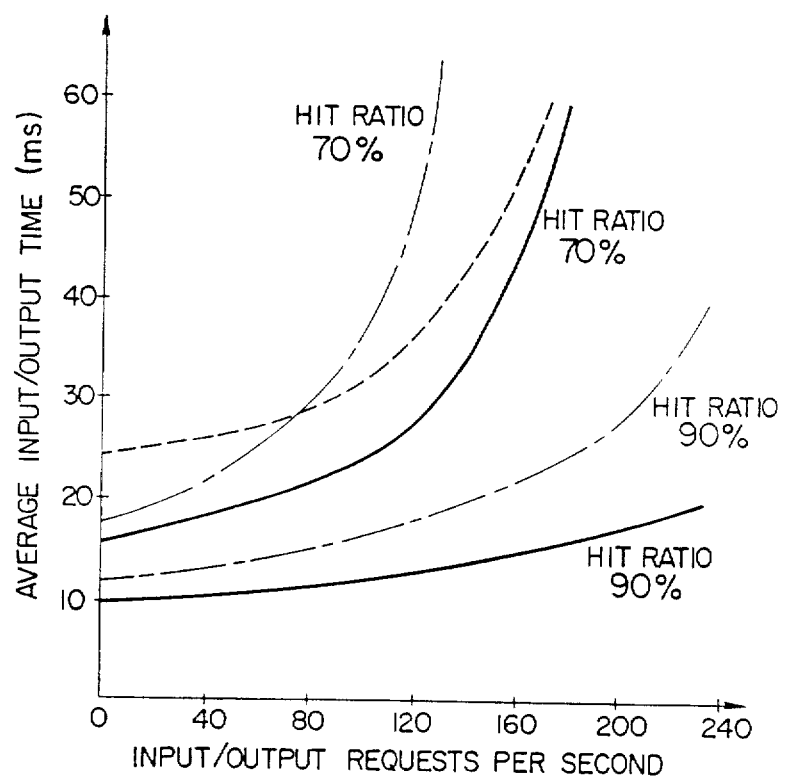
FIG. 22 is a graph illustrating the similation results where the horizontal axis represents the number of average input/output requests per second and the vertical axis indicates the average input/output time.

Simulations have been conducted to quantatively determine the effects of the present invention. FIG. 21 illustrates the model utilized for the simulations. The following conditions are assumed in this model: Read/write ratio=3:1, data length=4 KB, track length=47.5 KB, average seek time=16.0 ms, and transfer speed=3 MB/s. In the simulations, the preread for a sequential read is not performed and the hit ratio is set as an input value. FIG. 22 depicts the relationships between the average input/output time (ms) and the input/output requests per second for the following cases: The hit ratio is set as 70% and 90%; the parallel operation is performed and is not performed. For the reference, the input/output time periods obtained when the disk cache unit is not utilized are also shown in the graph. Even when the disk cache unit is adopted, the processing for reading a track for a read miss appears as a great overhead if the load is increased for low hit ratio, hence the input/output time period cannot be reduced. The parallel operation has apparently an advantageous feature to distribute the overhead. Even if the parallel operation is carried out however, the effect of the disk cache unit is lowered when the load increased for lower hit ratio.

We claim:

1. In an information processing system including a disk cache unit; a disk unit; a processing unit; a channel for transferring data relating to input/output processing of said processing unit; and a director connected to said channel, said disk unit, an said disk cache unit; the improvement in which said director comprises:
    first data transfer means connected to said channel and said disk cache unit by way of first and second transmission lines, respectively, and comprising a data transfer controlling system including a processor for transferring data between said channel and said disk cache unit; and
    second data transfer means connected to said disk cache unit and said disk unit by way of third and fourth transmission lines, respectively, and comprising a data transfer controlling system including a processor for transferring data between said disk cache unit and said disk unit when data is being transferred between said channel and said disk cache unit by said first data transfer means, thereby to transfer the data in parallel between said channel and said disk cache unit and between said disk cache unit and said disk unit.

2. A system according to claim 1, wherein said first data transfer means is connected to said disk unit by way of a fifth transmission line and includes means for transferring data between said channel and said disk unit, and wherein, said first data transfer means includes means for transferring data received from said channel simultaneously to said disk cache unit and said disk unit when said second data transfer means is not transferring data and said second data transfer means includes means for transferring data received from said disk unit to said disk cache unit when said first data transfer means is not transferring data between said channel and said disk unit.

3. A system according to claim 2, wherein said first data transfer means operates to transfer requested data from said disk cache unit to said channel when a read request from said channel results in a hit; and wherein said second data transfer means operates to transfer data including the requested data from said disk unit to said disk cache unit to write said data therein when said read request results in a miss, and said first data transfer means operates to transfer said requested data to said channel in parallel with the writing of the data from said unit to said disk cache unit when said read request results in a miss.

4. A system according to claim 2, wherein said first data transfer means operates to transfer data to said disk cache unit from the channel to thereby update the previous data in the disk cache unit when a write request results in a hit, and said second data transfer means operates to transfer the changed data from said disk cache unit to said disk, and wherein said first data transfer means operates to transfer data to a vacant area within said disk cache unit form the channel when a write request results in a miss, and said second data transfer means further operates to transfer said data from the vacant area within said disk cache unit to said disk unit.

5. In an information processing system including a disk cache unit; a disk unit; a processing unit; a channel for transferring data relating to input/output processing of said processing unit; and a director connected to said channel, said disk unit, and said disk cache unit; the improvement in which said director comprises:
    first data transfer means connected to said channel and said disk cache unit by way of first and second transmission lines, respectively, for transferring data between said channel and said disk cache unit; and
    second data transfer means connected to said disk cache unit and said disk unit by way of third and fourth transmission lines, respectively, for transferring data between said disk cache unit and said disk unit when data is being transferred between said channel and said disk cache unit by said first data transfer means, thereby to transfer the data in parallel between said channel and said disk cache unit and between said disk cache unit and said disk unit, wherein said first data transfer means is connected to said disk unit by way of a fifth transmission line and includes means for transferring data between said channel and said disk unit, and whereon, said first data transfer means includes means for transferring data received from said channel simultaneously to said disk cache unit and said disk unit when said second data transfer means is not transferring data, and said second data transfer means includes means for transferring data received from said disk unit to said disk cache unit when said first data transfer means is not transferring data between said channel and said disk unit.

6. A system according to claim 5, wherein said first data transfer means is adapted to transfer data requested by said channel from said disk unit to said channel and said disk cache unit simultaneously when a read request from said channel is missed, and said second transfer means is adapted to transfer data excepting the requested data from said disk unit to said disk cache unit, and wherein said first data transfer means is adapted to transfer the data requested by said channel from said disk cache unit to said channel when the read request from said channel is hit.

7. A system according to claim 5, wherein said first data transfer means operates to transfer data from said channel to said disk cache unit to thereby update the previous content of said disk cache unit when a write request from said channel results in a high, and said second data transfer means operates to transfer the updated data to said disk unit from said disk cache unit, and wherein said first data transfer means operates to transfer requested data from said channel to said disk unit when said write request results in a miss.

8. A system according to claim 7, wherein said first data transfer means is adapted to update data in said disk cache unit and data on said disk unit simultaneously when the write request from said channel results in a hit.

9. A method for transferring data in parallel in an information processing system including a disk cache unit, at least a disk unit, a processing unit, a plurality of channels, each channel for transferring data relating to input/output processing of said processing unit between said processing unit and said disk cache unit, and a plurality of directors, each director being connected to said channel, said disk unit, and said disk cache unit, said method comprising the steps of:

transferring data between said channel and said disk cache unit by means of each director connected to said channel and said disk cache unit;

transferring data between said disk cache unit and said disk unit by means of said each director connected to said disk cache unit and said disk unit; and said transferring of the data between said disk cache unit and said disk unit being carried out at the same time the data is being transferred between said channel and said disk cache unit in each director.

* * * * *